(12) United States Patent
Sato

(10) Patent No.: US 9,317,933 B2
(45) Date of Patent: Apr. 19, 2016

(54) IMAGE PROCESSING DEVICE AND METHOD

(75) Inventor: Kazushi Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 218 days.

(21) Appl. No.: 14/112,788

(22) PCT Filed: Apr. 27, 2012

(86) PCT No.: PCT/JP2012/061408
§ 371 (c)(1),
(2), (4) Date: Oct. 18, 2013

(87) PCT Pub. No.: WO2012/165095
PCT Pub. Date: Dec. 6, 2012

(65) Prior Publication Data
US 2014/0050413 A1    Feb. 20, 2014

(30) Foreign Application Priority Data

May 27, 2011   (JP) ................. 2011-119279

(51) Int. Cl.
| | |
|---|---|
| G06K 9/36 | (2006.01) |
| G06K 9/00 | (2006.01) |
| G06T 9/00 | (2006.01) |
| H04N 19/117 | (2014.01) |
| H04N 19/157 | (2014.01) |
| H04N 19/17 | (2014.01) |
| H04N 19/86 | (2014.01) |
| H04N 19/124 | (2014.01) |

(52) U.S. Cl.
CPC ............... *G06T 9/00* (2013.01); *H04N 19/117* (2014.11); *H04N 19/157* (2014.11); *H04N 19/17* (2014.11); *H04N 19/86* (2014.11); *H04N 19/124* (2014.11)

(58) Field of Classification Search
USPC .................. 382/232–233, 251, 260
See application file for complete search history.

(56) References Cited

U.S. PATENT DOCUMENTS

| | | | |
|---|---|---|---|
| 2004/0101059 A1* | 5/2004 | Joch et al. ................ | 375/240.29 |
| 2004/0184549 A1* | 9/2004 | Webb ....................... | 375/240.29 |
| 2007/0237241 A1* | 10/2007 | Ha et al. ................... | 375/240.27 |
| 2009/0257664 A1* | 10/2009 | Kao et al. ................. | 382/232 |
| 2009/0304086 A1* | 12/2009 | Shi et al. .................. | 375/240.24 |

(Continued)

FOREIGN PATENT DOCUMENTS

| | | |
|---|---|---|
| JP | 2005-295371 A | 10/2005 |
| JP | 2007-184871 A | 7/2007 |
| JP | 2008-011435 A | 1/2008 |

(Continued)

OTHER PUBLICATIONS

Thomas Wiegand, et al., "WD3: Working Draft 3 of High-Efficiency Video Coding" HEVC, vol. JCTVC-E603, Mar. 16-23, 2011, 193 Pages.

*Primary Examiner* — Kanjibhai Patel
(74) *Attorney, Agent, or Firm* — Sony Corporation

(57) ABSTRACT

The present technique relates to image processing devices and methods for enabling more appropriate removals of block distortions. When the difference between the quantization parameter QPc of a current region C and the quantization parameter QPN of a neighboring region N is determined to be larger than a predetermined threshold value, a deblocking filter adjusts the deblocking filtering operation so that stronger filtering is performed on a boundary between the current region and the neighboring region. This disclosure can be applied to image processing devices, for example.

18 Claims, 22 Drawing Sheets

(56) References Cited

U.S. PATENT DOCUMENTS

2011/0110603 A1* 5/2011 Ikai .............................. 382/260
2011/0194614 A1* 8/2011 Norkin et al. ............ 375/240.24

FOREIGN PATENT DOCUMENTS

| JP | 2009-164915 A | 7/2009 |
| JP | 2010-081539 A | 4/2010 |

* cited by examiner

FIG. 4

| | |
|---|---|
| EITHER p OR q BELONGS TO INTRA MACROBLOCK AND IS LOCATED ON MACROBLOCK BOUNDARY. | Bs=4 (Strongest Filtering) |
| EITHER p OR q BELONGS TO INTRA MACROBLOCK BUT IS NOT LOCATED ON MACROBLOCK BOUNDARY. | Bs=3 |
| BOTH p AND q DO NOT BELONG TO INTRA MACROBLOCK, AND ONE OF p AND q HAS TRANSFORM COEFFICIENT. | Bs=2 |
| BOTH p AND q DO NOT BELONG TO INTRA MACROBLOCK AND DO NOT HAVE TRANSFORM COEFFICIENT, BUT p AND q HAVE DIFFERENT REFERENCE FRAMES, DIFFERENT NUMBERS OF REFERENCE FRAMES, OR DIFFERENT mv VALUES. | Bs=1 |
| BOTH p AND q DO NOT BELONG TO INTRA MACROBLOCK, DO NOT HAVE TRANSFORM COEFFICIENT, AND DO HAVE THE SAME REFERENCE FRAMES AND THE SAME mv VALUES. | Bs=0 (No Filtering) |

FIG. 5

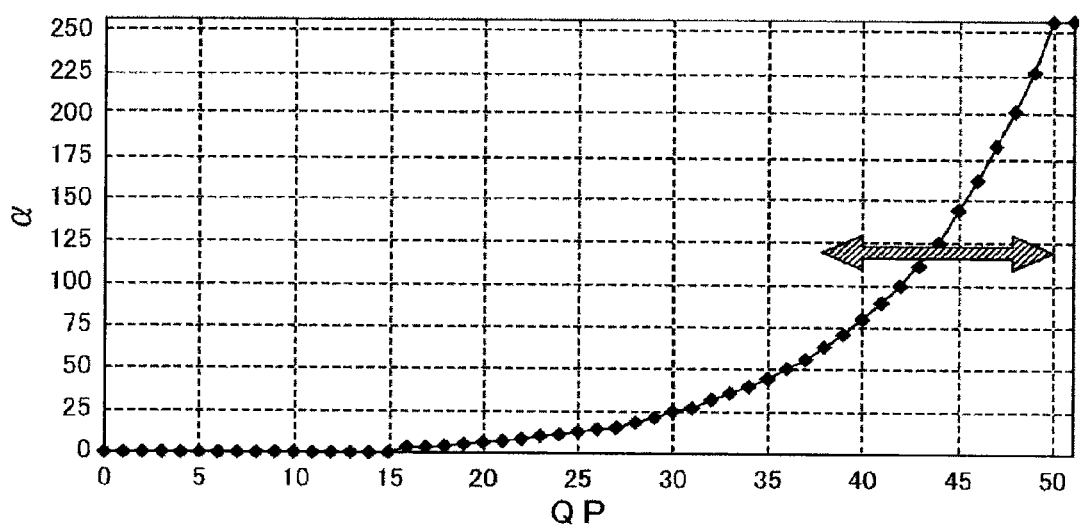

| indexA (for α) or indexB (for β) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| α | 0 | 0 | 0 | 0 | 0 | 0 | 0 | 0 | 0 | 0 | 0 | 0 | 0 | 0 | 0 | 0 | 4 | 4 | 5 | 6 | 7 | 8 | 9 | 10 | 12 | 13 |
| β | 0 | 0 | 0 | 0 | 0 | 0 | 0 | 0 | 0 | 0 | 0 | 0 | 0 | 0 | 0 | 0 | 2 | 2 | 2 | 3 | 3 | 3 | 3 | 4 | 4 | 4 |

B

| indexA (for α) or indexB (for β) | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|---|---|---|---|---|---|---|---|
| α | 15 | 17 | 20 | 22 | 25 | 28 | 32 | 36 | 40 | 45 | 50 | 56 | 63 | 71 | 80 | 90 | 101 | 113 | 127 | 144 | 162 | 182 | 203 | 226 | 255 | 255 |
| β | 6 | 6 | 7 | 7 | 8 | 8 | 9 | 9 | 10 | 10 | 11 | 11 | 12 | 12 | 13 | 13 | 14 | 14 | 15 | 15 | 16 | 16 | 17 | 17 | 18 | 18 |

| indexA | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| bs=1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 |
| bs=2 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 |
| bs=3 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 |

B

| indexA | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|---|---|---|---|---|---|---|---|
| bs=1 | 1 | 1 | 1 | 1 | 1 | 1 | 1 | 2 | 2 | 2 | 2 | 3 | 3 | 3 | 4 | 4 | 4 | 5 | 6 | 6 | 7 | 8 | 9 | 10 | 11 | 13 |
| bs=2 | 1 | 1 | 1 | 1 | 1 | 2 | 2 | 2 | 2 | 3 | 3 | 3 | 4 | 4 | 5 | 5 | 6 | 7 | 8 | 8 | 10 | 11 | 12 | 13 | 15 | 17 |
| bs=3 | 1 | 2 | 2 | 2 | 2 | 3 | 3 | 3 | 4 | 4 | 4 | 5 | 6 | 6 | 7 | 8 | 9 | 10 | 11 | 13 | 14 | 16 | 18 | 20 | 23 | 25 |

FIG. 20

| REGION N | REGION C | CALCULATION METHOD |
|---|---|---|
| ○ | ○ | AS IN CONVENTIONAL CASES |
| ○<br>× | ×<br>○ | PROPOSED TECHNIQUE 1 : BOUNDARY QP = $QP_N$<br>PROPOSED TECHNIQUE 2 : BOUNDARY QP = $(QP_N+prevQP_C+1)>>1$<br>PROPOSED TECHNIQUE 3 : BOUNDARY QP = $(QP_N+predQP_C+1)>>1$<br>PROPOSED TECHNIQUE 4 : BOUNDARY QP = $(QP_N+sliceQP_C+1)>>1$ |
| × | × | PROPOSED TECHNIQUE A : BOUNDARY QP = $(prevQP_N+prevQP_C+1)>>1$<br>PROPOSED TECHNIQUE B : BOUNDARY QP = $(predQP_N+predQP_C+1)>>1$<br>PROPOSED TECHNIQUE C : BOUNDARY QP = $(sliceQP_N+sliceQP_C+1)>>1$ |

IMAGE PROCESSING DEVICE AND METHOD

TECHNICAL FIELD

This disclosure relates to image processing devices and methods, and more particularly, to an image processing device and method for enabling more appropriate removals of block distortions.

BACKGROUND ART

In recent years, apparatuses that compress images by implementing an encoding method for compressing image information through orthogonal transforms such as discrete cosine transforms and motion compensation by using redundancy inherent to image information, have been spreading so as to handle image information as digital information and achieve high-efficiency information transmission and accumulation in doing do. This encoding method may be MPEG (Moving Picture Experts Group), for example.

Particularly, MPEG2 (ISO/IEC 13818-2) is defined as a general-purpose image encoding standard, and is applicable to interlaced images and non-interlaced images, and to standard-resolution images and high-definition images. MPEG2 is currently used in a wide range of applications for professionals and general consumers, for example. By using the MPEG2 compression method, a bit rate of 4 to 8 Mbps is assigned to a standard-resolution interlaced image having 720×480 pixels, for example. Also, by using the MPEG2 compression method, a bit rate of 18 to 22 Mbps is assigned to a high-resolution interlaced image having 1920×1088 pixels, for example. In this manner, a high compression rate and excellent image quality can be realized.

MPEG2 is designed mainly for high-quality image encoding suited for broadcasting, but is not compatible with lower bit rates than MPEG1 or encoding methods involving higher compression rates. As mobile terminals are becoming popular, the demand for such encoding methods is expected to increase in the future, and to meet the demand, the MPEG4 encoding method was standardized. As for an image encoding method, the ISO/IEC 14496-2 standard was approved as an international standard in December 1998.

On the standardization schedule, the standard was approved as an international standard under the name of H.264 and MPEG-4 Part 10 (Advanced Video Coding, hereinafter referred to as H. AVC) in March 2003.

As an extension of H.264/AVC, FRExt (Fidelity Range Extension) was standardized in February 2005. FRExt includes coding tools for business use, such as RGB, 4:2:2, and 4:4:4, and the 8×8 DCT and quantization matrix specified in MPEG-2. As a result, an encoding method for enabling excellent presentation of movies containing film noise was realized by using H.264/AVC, and the encoding method is now used in a wide range of applications such as Blu-ray Disc (a trade name).

However, there is an increasing demand for encoding at a higher compression rate so as to compress images having a resolution of about 4000×2000 pixels, which is four times higher than the high-definition image resolution, or distribute high-definition images in today's circumstances where transmission capacities are limited as in the Internet. Therefore, studies on improvement in encoding efficiency is still continued by VCEG (Video Coding Expert Group) under ITU-T.

At present, to achieve higher encoding efficiency than that of H.264/AVC, an encoding method called HEVC (High Efficiency Video Coding) is being developed as a standard by JCTVC (Joint Collaboration Team—Video Coding), which is a joint standards organization of ITU-T and ISO/IEC. As of April 2011, Non-Patent Document 1 related to HEVC has been issued as a draft.

CITATION LIST

Non-Patent Document

Non-Patent Document 1: Thomas Wiegand, Woo-jin Han, Benjamin Bross, Jens-Rainer Ohm, and Gary J. Sullivian, "WD3: Working Draft 3 of High-Efficiency Video Coding", JCTVc-E603, March 2011

SUMMARY OF THE INVENTION

Problems to be Solved by the Invention

In a case where there is a difference between the quantization parameter (QP=12, for example) of a current block to be processed and the quantization parameter (QP=40, for example) of a neighboring block adjacent to the current block, there should be conspicuous block distortions.

In the above described H.264/AVC, however, the difference in quantization parameter between a current block and a neighboring block is not taken into account, and it is difficult to remove a block distortion caused by the difference. The difference in quantization parameter between a current block and a neighboring block is not taken into consideration in HEVC either, and there is a need to take measures against block distortions to be caused by the difference.

This disclosure is made in view of those circumstances, and is to enable more appropriate removals of block distortions and increase subjective image quality in decoded images.

Solutions to Problems

An image processing device of one aspect of this disclosure includes: a decoding unit that decodes a bit stream encoded in a unit having a hierarchical structure, and generates an image; a filtering unit that performs a filtering operation on the image generated by the decoding unit; and a filter adjustment unit that adjusts a parameter of the filtering unit so as to perform a strong filtering operation on a boundary between a current region to be processed in the image generated by the decoding unit and a neighboring region adjacent to the current region, when a difference value between a quantization parameter of the current region and a quantization parameter of the neighboring region is larger than a threshold value.

The filter adjustment unit may control the filtering unit to select the stronger one of a predetermined strong filtering operation and a predetermined weak filtering operation.

The filter adjustment unit may adjust the parameter of the filtering unit when the boundary is a boundary of a region in which a quantization parameter can be set.

The parameter of the filtering unit may be a boundary strength value, and the filter adjustment unit may add 1 to the boundary strength value, and set the resultant value as the boundary strength value.

The parameter of the filtering unit may be a boundary strength value, and the filter adjustment unit may set 4 as the boundary strength value.

The parameter of the filtering unit may be a threshold value $\alpha$ and a threshold value $\beta$, and the filter adjustment unit may associate the threshold value α and the threshold value β with "QP+Δ (Δ>0)", instead of the corresponding quantization parameter QP.

The parameter of the filtering unit may be a quantization parameter value, and the filter adjustment unit may use the larger one of the quantization parameter of the current region and the quantization parameter of the neighboring region as the parameter of the filtering unit.

The parameter of the filtering unit may be a quantization parameter value, and, when one of the current region and the neighboring region is in the IPCM mode, the filter adjustment unit may use the quantization parameter of the other region as the parameter of the filtering unit.

The parameter of the filtering unit may be a quantization parameter value, and the filter adjustment unit may correct the quantization parameters of the current region and the neighboring region by using a DC component of a quantization matrix, and determine the parameter of the filtering unit by using the corrected quantization parameters.

The parameter of the filtering unit may be a quantization parameter value, and, when at least one region of the current region and the neighboring region does not have an orthogonal transform coefficient, the filter adjustment unit may determine the parameter of the filtering unit by using, as the quantization parameter of the at least one region, 0, a quantization parameter used in the region immediately before the at least one region, a predicted quantization parameter value for the region immediately before the at least one region, or a quantization parameter for the slice to which the at least one region belongs.

The threshold value is set as a value that varies between a filtering operation in a horizontal direction and a filtering operation in a vertical direction.

The threshold value is set as a value that varies with the size of the current region.

The threshold value is set as a value that becomes smaller as the size of the current region becomes larger.

The filter adjustment unit may control the filtering unit to perform a filtering operation on a luminance component of the image generated by the decoding unit.

The image processing device may further include a difference value calculation unit that calculates the difference value between the quantization parameter of the current region and the quantization parameter of the neighboring region.

An image processing method of the one aspect of this disclosure includes: generating an image by decoding a bit stream encoded in a unit having a hierarchical structure; when the difference value between a quantization parameter of a current region to be processed in the generated image and a quantization parameter of a neighboring region adjacent to the current region is larger than a threshold value, adjusting a filter parameter so as to perform a strong filtering operation on a boundary between the current region and the neighboring region; and performing the filtering operation on the generated image, an image processing device performing the image generating, the parameter adjusting, and the filtering operation.

An image processing device of the other aspect of this disclosure includes: a filtering unit that performs a filtering operation on a locally decoded image when an image is encoded; a filter adjustment unit that adjusts a parameter of the filtering unit so as to perform a strong filtering operation on a boundary between a current region to be processed in the image and a neighboring region adjacent to the current region, when the difference value between a quantization parameter of the current region and a quantization parameter of the neighboring region is larger than a threshold value; and an encoding unit that performs encoding in a unit having a hierarchical structure by using a predicted image that is the image subjected to the filtering operation.

An image processing method of the other aspect of this disclosure includes: adjusting a filter parameter so as to perform a strong filtering operation on a boundary between a current region to be processed in an image and a neighboring region adjacent to the current region, when the difference value between a quantization parameter of the current region and a quantization parameter of the neighboring region is larger than a threshold value; performing the filtering operation on a locally decoded image when the image is encoded; and performing encoding in a unit having a hierarchical structure by using a predicted image that is the image subjected to the filtering operation, an image processing device performing the parameter adjusting, the filtering operation, and the encoding.

In the one aspect of this disclosure, an image is generated by decoding a bit stream encoded in a unit having a hierarchical structure. When the difference value between a quantization parameter of a current region to be processed in the generated image and a quantization parameter of a neighboring region adjacent to the current region is larger than a threshold value, a filter parameter is adjusted so that a strong filtering operation is performed on a boundary between the current region and the neighboring region. The filtering operation is then performed on the generated image.

In the other aspect of this disclosure, when the difference value between a quantization parameter of a current region to be processed in an image and a quantization parameter of a neighboring region adjacent to the current region is larger than a threshold value, a filter parameter is adjusted so that a strong filtering operation is performed on a boundary between the current region and the neighboring region. When the image is encoded, the filtering operation is performed on a locally decoded image. Encoding is performed in a unit having a hierarchical structure by using a predicted image that is the image subjected to the filtering operation.

Each of the above described image processing devices may be an independent device, or may be an internal block forming an image encoding device or an image decoding device.

EFFECTS OF THE INVENTION

According to the one aspect of this disclosure, images can be decoded. Particularly, block distortions can be removed more appropriately.

According to the other aspect of this disclosure, images can be encoded. Particularly, block distortions can be removed more appropriately.

BRIEF DESCRIPTION OF DRAWINGS

FIG. 4 is a diagram for explaining a method of defining Bs.

FIG. 5 is a diagram for explaining the operating principles of the deblocking filter.

FIG. 6 is a diagram showing an example of correspondence relationships between indexA and indexB, and values of α and β.

FIG. 7 is a diagram showing an example of correspondence relationships among Bs, indexA, and tC0.

FIG. 20 is a diagram for explaining an operation compatible with the skip mode.

MODES FOR CARRYING OUT THE INVENTION

The following is a description of modes for embodying this disclosure (hereinafter referred to as the embodiments). Explanation will be made in the following order.
1. First Embodiment (Image Encoding Device)
2. Second Embodiment (Image Decoding Device)
3. Third Embodiment (Example Operation Compatible with the IPCM Mode)
4. Fourth Embodiment (Example Operation Compatible with a Quantization Matrix)
5. Fifth Embodiment (Example Operation Compatible with the Skip Mode)
6. Sixth Embodiment (Computer)
7. Seventh Embodiment (Example Applications)
<1. First Embodiment>
[Example Structure of an Image Encoding Device]

Figure 1:
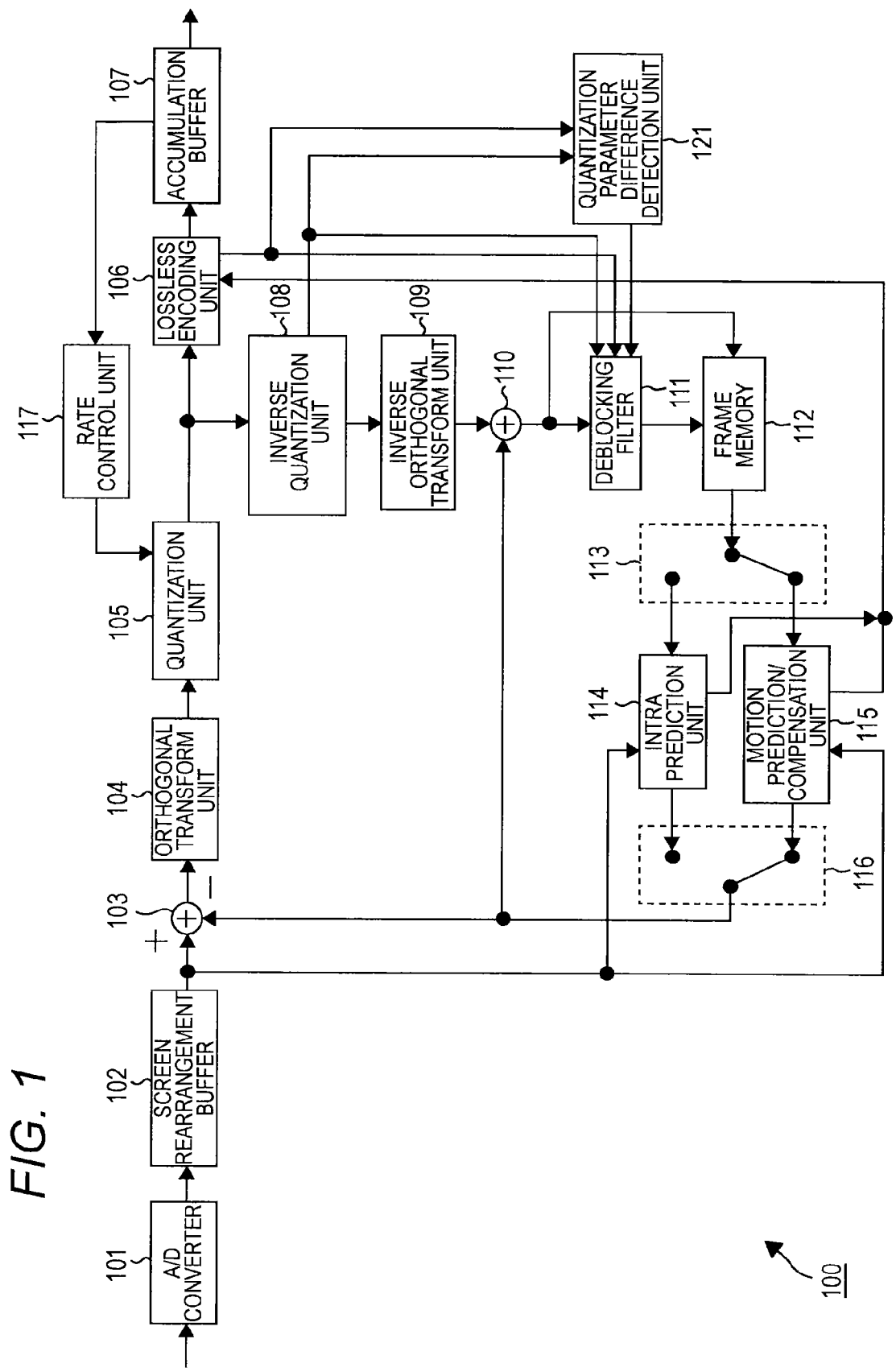
FIG. 1 is a block diagram showing a typical example structure of an image encoding device.

FIG. 1 shows the structure of an embodiment of an image encoding device as an image processing device to which this disclosure is applied.

The image encoding device 100 shown in FIG. 1 encodes image data by prediction operations. The encoding method used here may be H.264 and MPEG (Moving Picture Experts Group) 4 Part 10 (AVC (Advanced Video Coding)) (hereinafter referred to as H.264/AVC), or HEVC (High Efficiency Video Coding), for example.

In the example shown in FIG. 1, the image encoding device 100 includes an A/D (Analog/Digital) converter 101, a screen rearrangement buffer 102, an arithmetic operation unit 103, an orthogonal transform unit 104, a quantization unit 105, a lossless encoding unit 106, and an accumulation buffer 107. The image encoding device 100 also includes an inverse quantization unit 108, an inverse orthogonal transform unit 109, an arithmetic operation unit 110, a deblocking filter 111, a frame memory 112, a selection unit 113, an intra prediction unit 114, a motion prediction/compensation unit 115, a selection unit 116, and a rate control unit 117.

The image encoding device 100 further includes a quantization parameter difference detection unit 121.

The A/D converter 101 subjects input image data to an A/D conversion, and outputs and stores the resultant image data into the screen rearrangement buffer 102.

The screen rearrangement buffer 102 rearranges the image frames stored in displaying order in accordance with the GOP (Group of Pictures) structure, so that the frames are arranged in encoding order. The screen rearrangement buffer 102 supplies the image having the rearranged frame order to the arithmetic operation unit 103. The screen rearrangement buffer 102 also supplies the image having the rearranged frame order to the intra prediction unit 114 and the motion prediction/compensation unit 115.

The arithmetic operation unit 103 subtracts a predicted image supplied from the intra prediction unit 114 or the motion prediction/compensation unit 115 via the selection unit 116, from the image read from the screen rearrangement buffer 102, and outputs the difference information to the orthogonal transform unit 104.

When intra encoding is performed on an image, for example, the arithmetic operation unit 103 subtracts a predicted image supplied from the intra prediction unit 114, from the image read from the screen rearrangement buffer 102. When inter encoding is performed on an image, for example, the arithmetic operation unit 103 subtracts a predicted image supplied from the motion prediction/compensation unit 115, from the image read from the screen rearrangement buffer 102.

The orthogonal transform unit 104 performs an orthogonal transform operation, such as a discrete cosine transform or a Karhunen-Loeve transform, on the difference information supplied from the arithmetic operation unit 103, and supplies the transform coefficient to the quantization unit 105.

The quantization unit 105 quantizes the transform coefficient output from the orthogonal transform unit 104. The quantization unit 105 supplies the quantized transform coefficient to the lossless encoding unit 106.

The lossless encoding unit 106 performs lossless encoding, such as variable-length encoding or arithmetic encoding, on the quantized transform coefficient.

The lossless encoding unit 106 obtains information indicating an intra prediction mode and the like from the intra prediction unit 114, and obtains information indicating an inter prediction mode, motion vector information, and the like from the motion prediction/compensation unit 115.

The lossless encoding unit 106 not only encodes the quantized transform coefficient, but also incorporates (multiplexes) various kinds of syntax elements such as the intra prediction mode information, the inter prediction mode information, the motion vector information, and the quantization parameter, into the header information of encoded data. The lossless encoding unit 106 supplies and stores the encoded data obtained through the encoding into the accumulation buffer 107. The lossless encoding unit 106 also supplies the syntax elements to the deblocking filter 111 and the quantization parameter difference detection unit 121.

For example, in the lossless encoding unit 106, a lossless encoding operation such as variable-length encoding or arithmetic encoding is performed. The variable-length encoding may be CAVLC (Context-Adaptive Variable Length Coding), for example. The arithmetic encoding may be CABAC (Context-Adaptive Binary Arithmetic Coding) or the like.

The accumulation buffer 107 temporarily stores the encoded data supplied from the lossless encoding unit 106, and outputs the encoded data as an encoded image to a recording device or a transmission path (not shown) in a later stage at a predetermined time, for example.

The transform coefficient quantized at the quantization unit 105 is also supplied to the inverse quantization unit 108. The inverse quantization unit 108 inversely quantizes the quantized transform coefficient by a method compatible with the quantization performed by the quantization unit 105. The inverse quantization unit 108 supplies the obtained transform coefficient to the inverse orthogonal transform unit 109. The inverse quantization unit 108 also supplies the quantization parameter used at the time of inverse quantization to the deblocking filter 111 and the quantization parameter difference detection unit 121.

The inverse orthogonal transform unit 109 performs an inverse orthogonal transform on the supplied transform coefficient by a method compatible with the orthogonal transform operation performed by the orthogonal transform unit 104. The output subjected to the inverse orthogonal transform (the restored difference information) is supplied to the arithmetic operation unit 110.

The arithmetic operation unit 110 obtains a locally decoded image (a decoded image) by adding the predicted image supplied from the intra prediction unit 114 or the motion prediction/compensation unit 115 via the selection unit 116 to the inverse orthogonal transform result supplied from the inverse orthogonal transform unit 109 or the restored difference information.

For example, when the difference information corresponds to an image to be intra-encoded, the arithmetic operation unit 110 adds the predicted image supplied from the intra prediction unit 114 to the difference information. When the difference information corresponds to an image to be inter-encoded, the arithmetic operation unit 110 adds the predicted image supplied from the motion prediction/compensation unit 115 to the difference information, for example.

The addition result is supplied to the deblocking filter 111 and the frame memory 112.

The deblocking filter 111 removes block distortions from the decoded image by performing a deblocking filtering operation where necessary. Before doing so, the deblocking filter 111 refers to the quantization parameter from the inverse quantization unit 108 and the syntax elements from the lossless encoding unit 106 in accordance with a control signal from the quantization parameter difference detection unit 121, and adjusts the parameters for the deblocking filtering operation. The deblocking filter 111 supplies the filtering operation result to the frame memory 112.

The frame memory 112 outputs a stored reference image to the intra prediction unit 114 or the motion prediction/compensation unit 115 via the selection unit 113 at a predetermined time.

When intra encoding is performed on an image, for example, the frame memory 112 supplies the reference image to the intra prediction unit 114 via the selection unit 113. When inter encoding is performed on an image, for example, the frame memory 112 supplies the reference image to the motion prediction/compensation unit 115 via the selection unit 113.

When the reference image supplied from the frame memory 112 is an image to be subjected to intra encoding, the selection unit 113 supplies the reference image to the intra prediction unit 114. When the reference image supplied from the frame memory 112 is an image to be subjected to inter encoding, the selection unit 113 supplies the reference image to the motion prediction/compensation unit 115.

The intra prediction unit 114 performs intra predictions (intra-screen predictions) to generate a predicted image by using the pixel values in the screen. The intra prediction unit 114 performs intra predictions in more than one mode (intra prediction modes).

The intra prediction unit 114 generates predicted images in all the intra prediction modes, evaluates the respective predicted images, and selects an optimum mode. After selecting the optimum intra prediction mode, the intra prediction unit 114 supplies the predicted image generated in the optimum intra prediction mode to the arithmetic operation unit 103 and the arithmetic operation unit 110 via the selection unit 116.

As described above, the intra prediction unit 114 also supplies information such as the intra prediction mode information indicating the adopted intra prediction mode to the lossless encoding unit 106 where appropriate.

Using the input image supplied from the screen rearrangement buffer 102, and the reference image supplied from the frame memory 112 via the selection unit 113, the motion prediction/compensation unit 115 performs motion predictions on an image to be subjected to inter encoding, and performs a motion compensation operation in accordance with the detected motion vectors, to generate a predicted image (inter predicted image information).

The motion prediction/compensation unit 115 performs inter predicting operations in all candidate inter prediction modes, to generate a predicted image. The motion prediction/compensation unit 115 supplies the generated predicted image to the arithmetic operation unit 103 and the arithmetic operation unit 110 via the selection unit 116.

The motion prediction/compensation unit 115 supplies the inter prediction mode information indicating the adopted inter prediction mode, and motion vector information indicating the calculated motion vectors to the lossless encoding unit 106.

When intra encoding is performed on an image, the selection unit 116 supplies the output of the intra prediction unit 114 to the arithmetic operation unit 103 and the arithmetic operation unit 110. When inter encoding is performed on an image, the selection unit 116 supplies the output of the motion prediction/compensation unit 115 to the arithmetic operation unit 103 and the arithmetic operation unit 110.

Based on the compressed images accumulated in the accumulation buffer 107, the rate control unit 117 controls the quantization operation rate of the quantization unit 105 so as not to cause an overflow or underflow.

The quantization parameter difference detection unit 121 generates a quantization parameter difference value between a current region and a neighboring region adjacent to the current region by referring to the syntax elements from the lossless encoding unit 106 and the quantization parameter from the inverse quantization unit 108. The quantization parameter difference detection unit 121 compares the generated difference value with a predetermined threshold value, and supplies a control signal based on the comparison result to the deblocking filter 111.

[Coding Unit]

Figure 2:
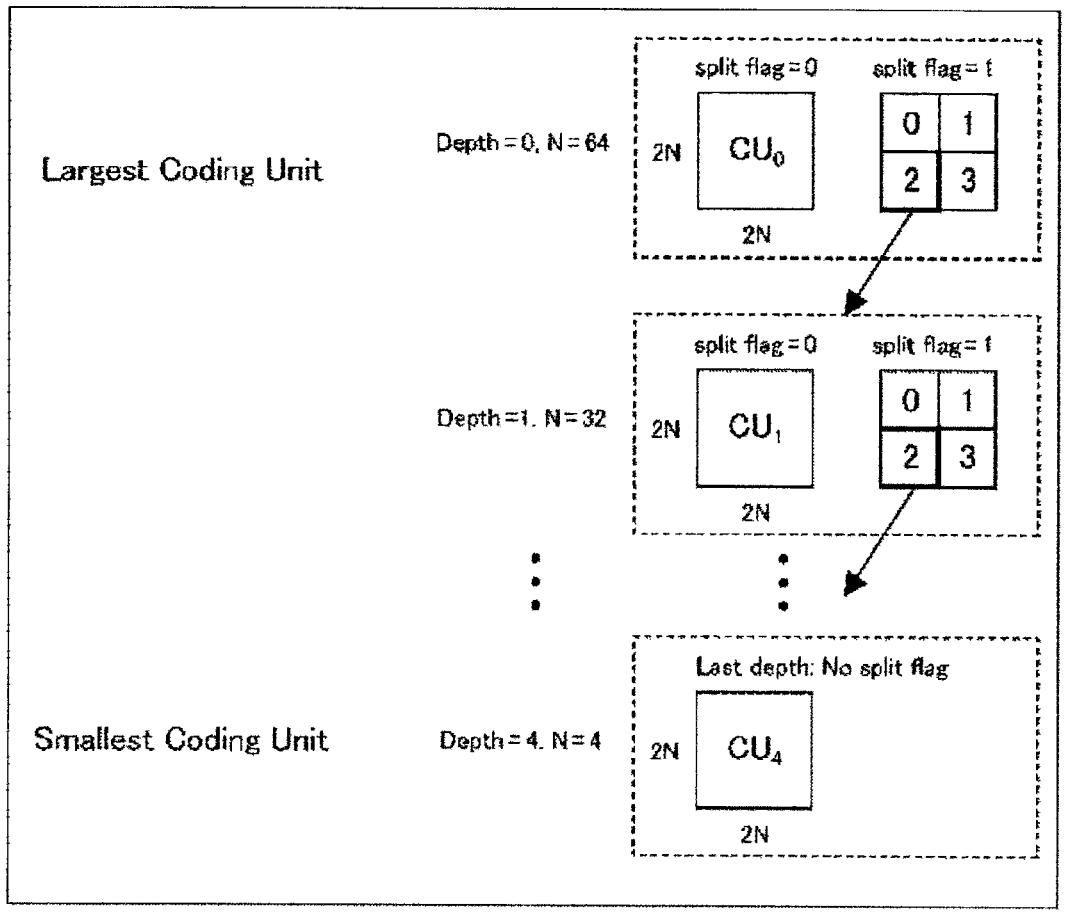
FIG. 2 is a diagram for explaining example structures of coding units.

According to H.264/AVC, one macroblock is divided into motion compensation blocks, and the respective motion compensation blocks can be made to have different motion information. Specifically, H.264/AVC specifies a hierarchical structure formed with macroblocks and sub macroblocks, but HEVC (High Efficiency Video Coding) specifies coding units (CUs) as shown in FIG. 2.

CUs are also called Coding Tree Blocks (CTBs), and are partial regions of picture-based images that have the same roles as those of macroblocks compliant with H.264/AVC. While the size of the latter is limited to 16×16 pixels, the size of the former is not limited to a certain size, and may be designated by the compressed image information in each sequence.

For example, in a sequence parameter set (SPS) contained in encoded data to be output, the largest coding unit (LCU) and the smallest coding unit (SCU) of the CUs are specified.

In each LCU, split_flag=1 is set within a range not smaller than the SCU size, so that each LCU can be divided into CUs of a smaller size. In the example shown in FIG. 2, the size of the LCU is 128, and the greatest hierarchical depth is 5. When the value of split_flag is "1", a CU of 2N×2N in size is divided into CUs of N×N in size, which is one hierarchical level lower.

Each of the CUs is further divided into prediction units (PUs) that are processing-unit regions (partial regions of picture-based images) for intra or inter predictions, or are divided into transform units (TUs) that are processing-unit regions (partial regions of picture-based images) for orthogonal transforms. At present, 16×16 and 32×32 orthogonal transforms, as well as 4×4 and 8×8 orthogonal transforms, can be used according to HEVC.

In a case where CUs are defined, and each processing operation is performed on the CU basis in an encoding operation as in an operation according to HEVC, the macroblocks compliant with H.264/AVC can be considered equivalent to the LCUs. However, a CU has a hierarchical structure as shown in FIG. 2. Therefore, the size of the LCU on the highest hierarchical level is normally as large as 128×128 pixels, which is larger than the size of each macroblock compliant with H.264/AVC, for example.

This disclosure can be applied not only to encoding methods using macroblocks compliant with H.264/AVC, but also to encoding methods using CUs, PUs, TUs, and the like as in operations according to HEVC. That is, both a "block" and a "unit" mean a "processing-unit region", and therefore, a "processing-unit region", which is either a block or a unit, will be used in the following description.

In the descriptions of examples involving H.264/AVC in the following, blocks are used in the descriptions, and the blocks are processing-unit regions that are units in HEVC. In the descriptions of examples involving HEVC, on the other hand, units are used in the descriptions, and the units are processing-unit regions that are blocks in H.264/AVC.

[Deblocking Filter]

Next, a deblocking filter compliant with H.264/AVC is described. The deblocking filter 111 eliminates block distortions that are contained in motion compensation loops and in decoded images, or distortions in processing-unit regions. As a result, transmission of block distortions to the image to be referred to in motion compensation operations is prevented.

An operation of a deblocking filter can be selected from the three options (a) through (c) shown below in accordance with the two parameters: deblocking_filter_control_present_flag contained in Picture Parameter Set RBSP (Raw Byte Sequence Payload), and disable_deblocking_filter_idc contained in the slice header (Slice Header).

(a) To be performed on a block boundary or a macroblock boundary
(b) To be performed only on a macroblock boundary
(c) Not to be performed As for the quantization parameter QP, QPY is used when the following operation is performed on luminance signals, and QPC is used when the following operation is performed on chrominance signals. In motion vector encoding, intra predictions, and entropy encoding (CAVLC/CABAC), pixel values that belong to a different slice are processed as "not available". However, in deblocking filtering operations, pixel values that belong to a different slice but belong to the same picture are processed as "available".

Figure 3:
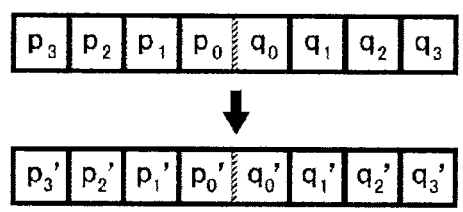
FIG. 3 is a diagram for explaining the operating principles of the deblocking filter.

In the following, pixel values yet to be subjected to a deblocking filtering operation are represented by p0 through p3 and q0 through q3, and processed pixel values are represented by p0' through p3' and q0' through q3', as shown in FIG. 3.

Prior to a deblocking filtering operation, Bs (Boundary strength) that is block boundary strength data is defined for each of the pixels p and q shown in FIG. 3, as in the table shown in FIG. 4.

As shown in FIG. 4, when either a pixel p or a pixel q belongs to a macroblock to be subjected to intra encoding, and the pixel is located on a boundary between macroblocks, "4", which indicates the highest filtering strength, is allocated to Bs.

When either a pixel p or a pixel q belongs to a macroblock to be subjected to intra encoding, and the pixel is not located on a boundary between macroblocks, "3", which indicates the highest filtering strength after "4", is allocated to Bs.

When both the pixels p and the pixels q do not belong to a macroblock to be subjected to intra encoding, and one of the pixels has a transform coefficient, "2", which indicates the highest filter intensity after "3", is allocated to Bs.

Bs is "1" when both the pixels p and the pixels q do not belong to a macroblock to be subjected to intra encoding, any of the pixels does not have a transform coefficient, and the pixels have different reference frames, different numbers of reference frames, or different motion vectors.

Bs is "0" when both the pixels p and the pixels q do not belong to a macroblock to be subjected to intra encoding, and both pixels do not have a transform coefficient but have the same reference frames and the same motion vectors. It should be noted that "0" means that any filtering operation is not to be performed.

Only when the two conditions expressed by the expression (1) and the expression (2) shown below are satisfied, is a deblocking filtering operation performed on (p2, p1, p0, q0, q1, and q2) in FIG. 3.

$$Bs>0 \tag{1}$$

$$|p0-q0|<\alpha; |p1-p0|<\beta; |q1-q1|<\beta \tag{2}$$

Although $\alpha$ and $\beta$ in the expression (2) have values determined in accordance with QP in default configuration as shown below, the user can adjust the strength by using the two parameters "slice_alpha_c0_offset_div2" and "slice_beta_offset_div2" contained in the slice header in encoded data, as indicated by the arrows in the graph.

FIG. 5 shows the relationship between QP and a threshold value $\alpha$. When an offset is added to QP, the curve representing the relationship between QP and a threshold value $\alpha$ shifts in the directions shown by the arrows. Accordingly, it is apparent that the filtering strength can be adjusted.

Also, the threshold value α is determined from the table shown in A in FIG. 6 by calculating "indexA" according to the expression (3) and the expression (4) shown below with the use of the respective quantization parameters $qP_p$ and $qP_q$ of a block P and a block Q adjacent to each other. Likewise, the threshold value β is determined from the table shown in B in FIG. 6 by calculating "indexB" according to the expression (3) and the expression (5) with the use of the respective quantization parameters $qP_p$ and $qP_q$ of the block P and the block Q adjacent to each other. The "indexA" and "indexB" are defined as shown in the following expressions (3) through (5).

$$qP_{av}=(qP_p+qP_q+1)>>1 \tag{3}$$

$$indexA=Clip3(0,51,qP_{av}+FilterOffsetA) \tag{4}$$

$$indexB=Clip3(0,51,qP_{av}+FilterOffsetB) \tag{5}$$

In the expressions (4) and (5), "FilterOffsetA" and "FilterOffsetB" are equivalent to the portions to be adjusted by the user.

Different methods are defined for deblocking filtering operations in cases where Bs<4, and where Bs=4, as described below.

First, where Bs<4, the pixel values p'0 and q'0 subjected to the deblocking filtering operation are calculated according to the following expressions (6) through (8).

$$\Delta=Clip3(-t_c,t_c((((q0-p0)<<2)+(p1-q1)+4)>>3)) \tag{6}$$

$$p'0=Clip1(p0+\Delta) \tag{7}$$

$$q'0=Clip1(q0+\Delta) \tag{8}$$

Here, $t_c$ is calculated as shown in the expression (9) or (10) shown below. Specifically, where the value of "chromaEdgeFlag" is 0, $t_c$ is calculated according to the expression (9) shown below.

$$t_c=t_c0+((a_p<\beta)?1:0)+((a_q<\beta)?1:0) \tag{9}$$

Where the value of "chromaEdgeFlag" is not 0, $t_c$ is calculated according to the expression (10) shown below.

$$t_c=t_c0+1 \tag{10}$$

The value of $t_{c0}$ is defined in accordance with the values of Bs and "indexA", as shown in the tables in FIGS. 7A and 7B.

Also, the values of $a_p$ and $a_q$ in the expression (9) are calculated according to the expressions (11) and (12) shown below.

$$a_p=|p2-p0| \tag{11}$$

$$a_q=|q2-q0| \tag{12}$$

The pixel value p'1 subjected to the deblocking filtering operation is determined as described below. Specifically, where the value of "chromaEdgeFlag" is "0", and the value of $a_p$ is equal to or smaller than β, p'1 is calculated according to the expression (13) shown below.

$$p'1=p1+Clip3(-t_{c0},t_{c0},(p2+((p0+q0+1)>>1)-(p1<<1))>>1) \tag{13}$$

When the expression (13) is not satisfied, p'1 is calculated according to the expression (14) shown below.

$$p'1=p1 \tag{14}$$

The pixel value q'1 subjected to the deblocking filtering operation is determined as described below. Specifically, where the value of "chromaEdgeFlag" is "0", and the value of $a_q$ is equal to or smaller than β, q'1 is calculated according to the expression (15) shown below.

$$q'1=q1+Clip3(-t_{c0},t_{c0},(q2+((p0+q0+1)>>1)-(q1<<1))>>1) \tag{15}$$

When the expression (15) is not satisfied, q'1 is calculated according to the expression (16) shown below.

$$q'1=q1 \tag{16}$$

The values of p'2 and q'2 are the same as the values of p2 and q2 prior to the filtering. Specifically, p'2 is determined according to the expression (17) shown below, and q'2 is determined according to the expression (18) shown below.

$$p'2=p2 \tag{17}$$

$$q'2=q2 \tag{18}$$

Next, where Bs=4, the pixel values p'i (i=0, . . . , 2) subjected to the deblocking filtering operation are calculated as described below. When the value of "chromaEdgeFlag" is "0", and the condition shown in the expression (19) is satisfied, p'0, p'1, and p'2 are calculated according to the expressions (20) through (22) shown below.

$$Ap<\beta\&\&|p0-q0|<((\alpha>>2)+2) \tag{19}$$

$$p'0=(p2+2\times p1+2\times p0+2\times q0+q1+4)>>3 \tag{20}$$

$$p'1=(p2+p1+p0+q0+2)>>2 \tag{21}$$

$$p'2=(2\times p3+3\times p2+p1+p0+q0+4)>>3 \tag{22}$$

When the expression (19) is not satisfied, p'0, p'1, and p'2 are calculated according to the expressions (23) through (25) shown below.

$$p'0=(2\times p1+p0+q1+2)>>2 \tag{23}$$

$$p'1=p1 \tag{24}$$

$$p'2=p2 \tag{25}$$

The pixel values q'i (i=0, . . . , 2) subjected to the deblocking filtering operation are calculated as described below. Specifically, when the value of "chromaEdgeFlag" is "0", and the condition shown in the expression (26) is satisfied, q'0, q'1, and q'2 are calculated according to the expressions (27) through (29) shown below.

$$Aq<\beta\&\&|p0-q0|<((\alpha>>2)+2) \tag{26}$$

$$q'1==(p1+2\times p0+2\times q0+2\times q1+q2+4)>>3 \tag{27}$$

$$q'1=(p0+q0+q1+q2+2)>>2 \tag{28}$$

$$q'2=(2\times q3+3\times q2+q1+q0+p4+4)>>3 \tag{29}$$

When the expression (26) is not satisfied, q'0, q'1, and q'2 are calculated according to the expressions (30) through (32) shown below.

$$q'0=(2\times q1+q0+p1+2)>>2 \tag{30}$$

$$q'1=q1 \tag{31}$$

$$q'2=q2 \tag{32}$$

[Deblocking Filter Adjusting Operation]

The deblocking filtering operation is performed as described above. Prior to the deblocking filtering operation, the parameters for the deblocking filtering operation are adjusted in accordance with the difference in the quantization parameter between neighboring blocks in the image encoding device 100.

Figure 8:
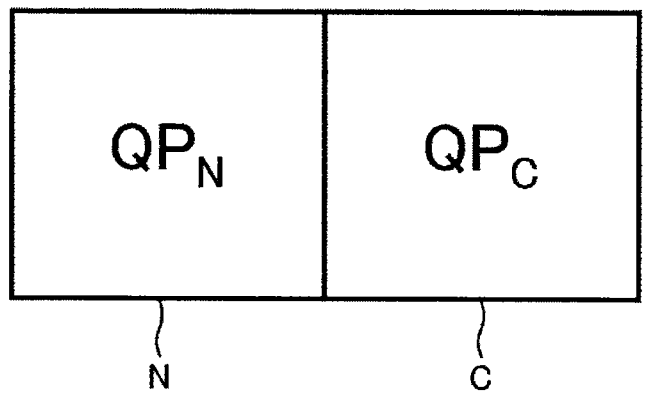
FIG. 8 is a diagram for explaining adjustment of the deblocking filter.

FIG. 8 is a diagram showing a current region and a neighboring region. In FIG. 8, each square represents a processing-unit region in the deblocking filtering operation. The square with QPc represents a current region C, and QPc represents the quantization parameter of the current region C. Likewise, the square with QPN represents a neighboring region N adjacent to the left edge of the current region, and QPN represents the quantization parameter of the neighboring region N.

The quantization parameter difference detection unit 121 determines whether the difference value between the quantization parameter QPc of the current region C and the quantization parameter QPN of the neighboring region N satisfies the following expression (33) with respect to a predetermined threshold value θ.

$$|QPc-QPN|>\theta \quad (33)$$

Here, the threshold value θ may have different values in the horizontal direction and the vertical direction in a case where an input sequence is of an interlace type or a side-by-side type.

Also, different threshold values may be set for regions of different sizes. Particularly, since block distortions in a region of a larger size easily attract attention, a smaller threshold value is set for a larger region size.

It is considered that, when the above expression (33) is satisfied, block distortions easily occur between the current region C and the neighboring region N. Therefore, the deblocking filter 111 adjusts the deblocking filtering operation so that stronger filtering can be performed by using one of the following methods. In other words, the deblocking filter 111 performs adjustment to increase the filtering strength.

By a first method, the deblocking filter 111 constantly sets the value of Bs defined by the above described table shown in FIG. 4 at 4 (Bs=4 (Strong Filtering)). That is, the value of Bs is fixed so that the strongest filtering can be performed. Alternatively, the deblocking filter 111 uses "Bs+1", instead of the value of Bs determined by the table shown in FIG. 4. When the value of "Bs+1" is 5, however, the value can be changed to 4.

By a second method, the deblocking filter 111 determines "QP+Δ (Δ>0)" as the quantization parameter to be associated with α and β in the above described tables shown in A in FIG. 6 and B in FIG. 6, instead of QP.

By the first method, there is no need to perform a branching operation required for later deblocking filtering operations once the quantization parameter difference value (the left-hand side of the expression (33)) exceeds a threshold value. Accordingly, the first method is advantageously realized with software.

By the second method, on the other hand, any additional circuit is not necessary, if "QP+Δ", instead of QP, can be input. Accordingly, the second method is advantageously implemented with hardware.

Also, the deblocking filter 111 can adjust the deblocking filtering operation by using the third method described below.

By the third method, the deblocking filter 111 performs the deblocking filtering operation by using the larger one of the quantization parameters of regions adjacent to each other. Specifically, in a case where QPN is 12 while QPc is 40 in the example shown in FIG. 8, the deblocking filter 111 uses QP=40 as the quantization parameter for the deblocking filtering operation in both of the regions.

That is, by the first through third methods, the values of the predetermined parameters (Bs, α, β, and the quantization parameter) among filtering parameters so that strong deblocking filtering can be performed.

By performing the above described adjustment, stronger filtering than that specified in H.264/AVC can be performed when the difference in quantization parameter between a current region and a neighboring region is large. As a result, a block distortion removal can be performed more appropriately than in an operation according to H.264/AVC.

Here, a processing-unit region for an orthogonal transform (a TU in the case of HEVC) is used as a processing unit in the deblocking filtering operation. According to H.264/AVC, quantization parameters can be set for macroblocks. According to HEVC, quantization parameters can be set only for larger CUs than a predetermined size (MaxCuSizeDQP).

Figure 9:
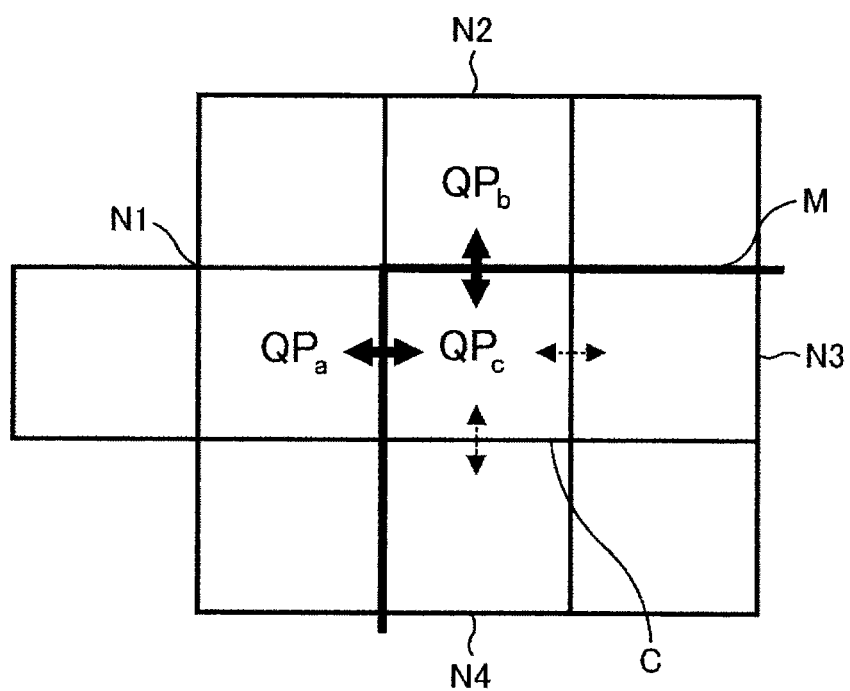
FIG. 9 is a diagram for explaining boundaries between regions.

FIG. 9 is a diagram showing a current region and four neighboring regions. In FIG. 9, each square represents a processing-unit region in a deblocking filtering operation (a TU in the case of HEVC), and QP in each square represents the quantization parameter of each corresponding region.

Specifically, the quantization parameter of the current region C is QPc. The quantization parameter of the neighboring region N1 adjacent to the left edge of the current region C is QPa. The quantization parameter of the neighboring region N2 adjacent to the upper edge of the current region C is QPb.

Here, the thick lines indicate the boundaries of a region M (a CU in the case of HEVC) in which quantization parameters can be set. Of the neighboring regions adjacent to the current region C, the neighboring region N1 and the neighboring region N2 are adjacent to the boundary of the region M that includes the current region C. On the other hand, of the neighboring regions adjacent to the current region C, a neighboring region N3 and a neighboring region N4 are included in the region M that also includes the current region C.

That is, any quantization parameter is not shown in the neighboring region N3 adjacent to the right edge of the current region C and the neighboring region N4 adjacent to the lower edge of the current region C, because the quantization parameter of the current region C and the quantization parameters of the neighboring region N3 and the neighboring region N4 are QPc.

Therefore, among the neighboring regions, those requiring adjustment of the deblocking filtering operation are the current region C and the neighboring region N1, and the current region C and the neighboring region N2, which are indicated by the thick arrows. There is no need to perform adjustment of the deblocking filtering operation on the current region C and the neighboring region N3, and the current region C and the neighboring region N4, which are indicated by the arrows with dashed lines.

As described above, the adjustment of the deblocking filtering operation according to this disclosure is performed only on the boundaries of regions having such sizes that quantization parameters can be set therein.

[Example Structures of the Deblocking Filter and the Quantization Parameter Difference Detection Unit]

Figure 10:
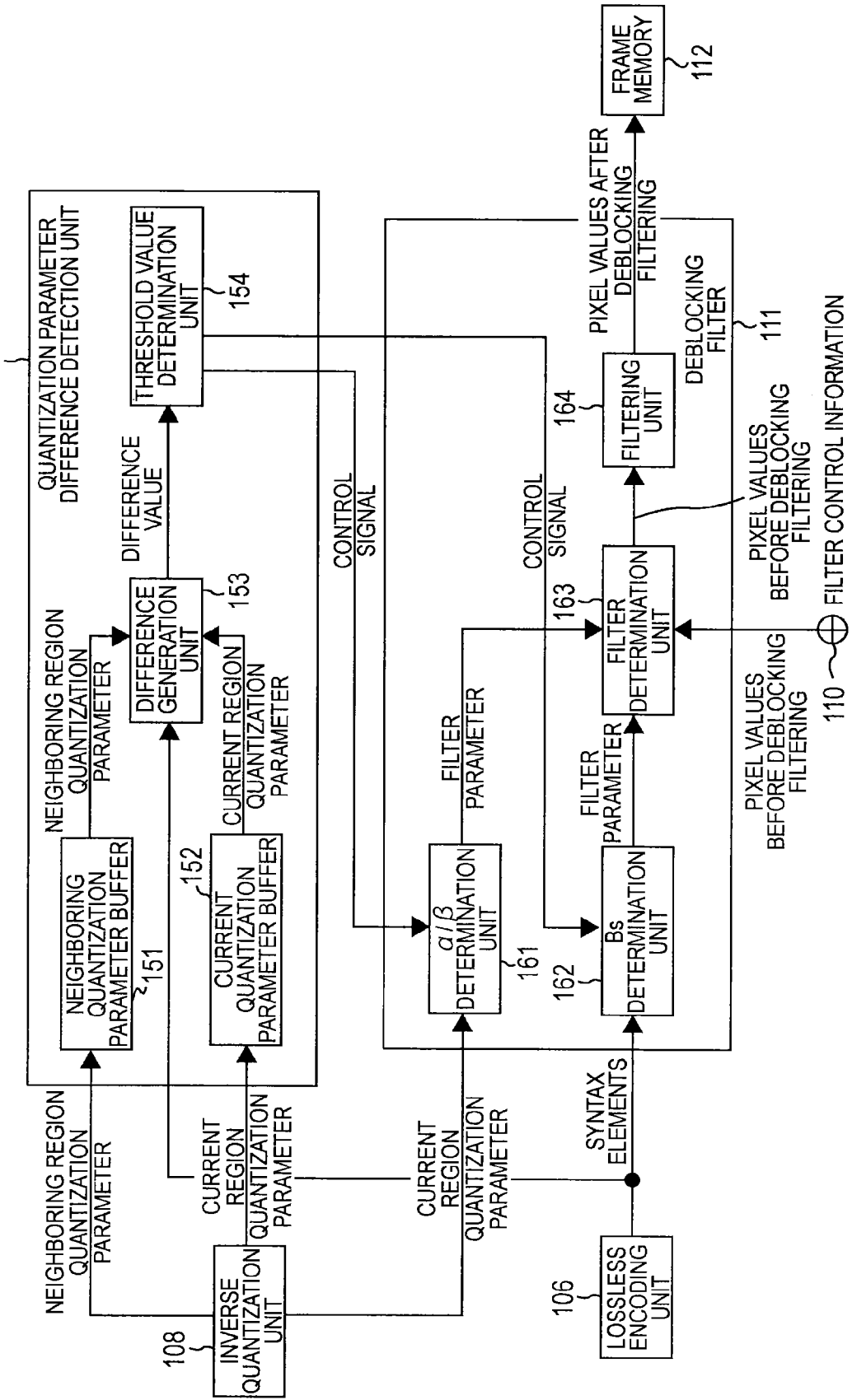
FIG. 10 is a diagram showing example structures of the quantization parameter difference detection unit and the deblocking filter.

Next, the respective components of the image encoding device 100 are described. FIG. 10 is a block diagram showing example structures of the deblocking filter 111 and the quantization parameter difference detection unit 121.

In the example shown in FIG. 10, the deblocking filter 111 has a structure that includes an α/β determination unit 161, a Bs determination unit 162, a filter determination unit 163, and a filtering unit 164.

The quantization parameter difference detection unit 121 has a structure that includes a neighboring quantization parameter buffer 151, a current quantization parameter buffer 152, a difference generation unit 153, and a threshold value determination unit 154.

A neighboring region quantization parameter from the inverse quantization unit 108 is supplied to the neighboring quantization parameter buffer 151. A current region quantization parameter from the inverse quantization unit 108 is supplied to the current quantization parameter buffer 152 and the α/β determination unit 161. Syntax elements from the lossless encoding unit 106 are supplied to the difference generation unit 153 and the Bs determination unit 162.

The neighboring quantization parameter buffer 151 accumulates the neighboring region quantization parameter from the inverse quantization unit 108. The current quantization parameter buffer 152 accumulates the current region quantization parameter from the inverse quantization unit 108.

Based on the syntax elements from the lossless encoding unit 106, the difference generation unit 153 determines whether the boundary between the current region and the neighboring region is a boundary of a region having such a size that quantization parameters can be set therein. When determining that the region has such a size that quantization parameters can be set therein, the difference generation unit 153 performs the operation described below. When it is determined the region does not have such a size that quantization parameters can be set therein, the operation described below is not performed.

The difference generation unit 153 reads the neighboring region quantization parameter from the neighboring quantization parameter buffer 151, and reads the current region quantization parameter from the current quantization parameter buffer 152. The difference generation unit 153 generates a quantization parameter difference value (the left-hand side of the expression (33)), which is the difference value between the read quantization parameters, and supplies the generated difference value to the threshold value determination unit 154.

The threshold value determination unit 154 compares the difference value from the difference generation unit 153 with a threshold value, and supplies a control signal indicating whether the difference value is larger than the threshold value, or whether the boundary easily has block distortions, to the α/β determination unit 161 and the Bs determination unit 162.

Based on the current region quantization parameter from the inverse quantization unit 108, the α/β determination unit 161 determines the values of α and β of the above described expression (2) as an adjustment of the filter parameters. At this point, if the control signal from the threshold value determination unit 154 indicates that the difference value is larger than the threshold value, the α/β determination unit 161 associates "QP+Δ", instead of QP, as the quantization parameter with α and β in the above described tables shown in A in FIG. 6 and B in FIG. 6.

The α/β determination unit 161 supplies the determined values of α and β as one of the filter parameters to the filter determination unit 163.

By referring to the syntax elements from the lossless encoding unit 106, the Bs determination unit 162 determines the value of Bs as an adjustment of the filter parameters, as shown in the table in FIG. 4. At this point, if the control signal from the threshold value determination unit 154 indicates that the difference value is larger than the threshold value, the Bs determination unit 162 uses "Bs+1", for example, instead of Bs. Alternatively, if the control signal from the threshold value determination unit 154 indicates that the difference value is larger than the threshold value, the Bs determination unit 162 uses Bs=4.

The Bs determination unit 162 supplies the determined value of Bs as one of the filter parameters to the filter determination unit 163.

Pixel values yet to be subjected to deblocking filtering are input from the arithmetic operation unit 110 to the filter determination unit 163. The filter determination unit 163 determines a filter, using the filter parameters from the α/β determination unit 161 and the Bs determination unit 162, and the pixel values yet to be subjected to deblocking filtering. That is, the filter determination unit 163 determines whether strong filtering is to be performed, whether weak filtering is to be performed, or whether no filtering is to be performed on the boundary between the current region and the neighboring region, and determines the filter that is to be used in the filtering.

The filter determination unit 163 supplies control information about the determined filter and the pixel values yet to be subjected to deblocking filtering, to the filtering unit 164.

Based on the control information about the filter determined by the filter determination unit 163, the filtering unit 164 performs a deblocking filtering operation on the pixel values yet to be subjected to deblocking filtering. The filtering unit 164 outputs the pixel values subjected to the deblocking filtering to the frame memory 112.

[Encoding Operation Flow]

Figure 11:
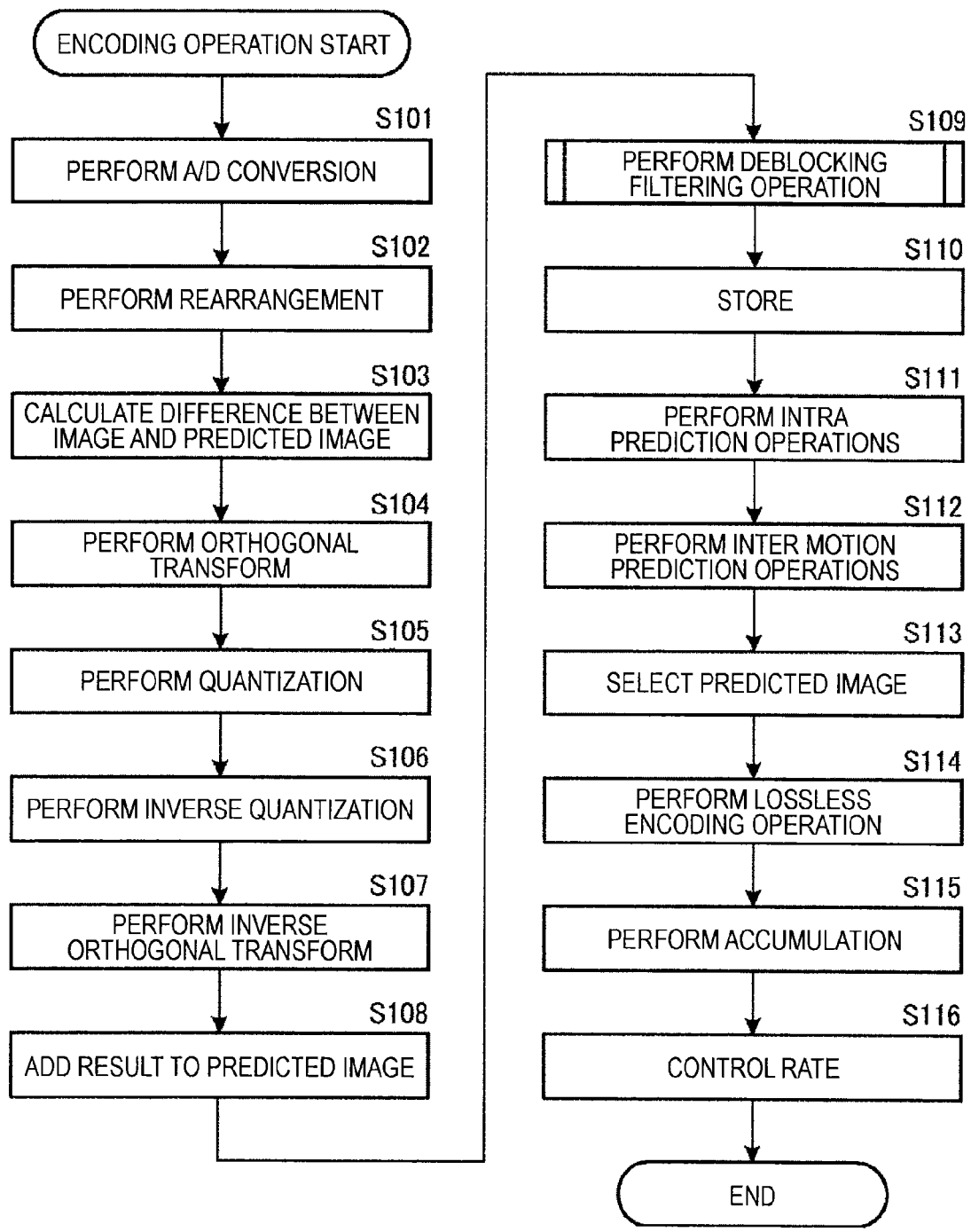
FIG. 11 is a flowchart for explaining an example flow in an encoding operation.

Next, the flow in each operation to be performed by the above described image encoding device 100 is described. Referring first to the flowchart shown in FIG. 11, an example flow in an encoding operation is described.

In step S101, the A/D converter 101 performs an A/D conversion on input images. In step S102, the screen rearrangement buffer 102 stores the images subjected to the A/D conversion, and rearranges the respective pictures in encoding order, instead of displaying order.

In step S103, the arithmetic operation unit 103 calculates the difference between the images rearranged in the procedure of step S102 and a predicted image. The predicted image is supplied to the arithmetic operation unit 103 via the selection unit 116 from the motion prediction/compensation unit 115 when an inter prediction is performed, and from the intra prediction unit 114 when an intra prediction is performed.

The data amount of the difference data is smaller than that of the original image data. Accordingly, the data amount can be made smaller than in a case where images are directly encoded.

In step S104, the orthogonal transform unit 104 performs an orthogonal transform on the difference information generated in the procedure of step S103. Specifically, an orthogonal transform such as a discrete cosine transform or a Karhunen-Loeve transform is performed, and a transform coefficient is output.

In step S105, the quantization unit 105 quantizes the orthogonal transform coefficient obtained in the procedure of step S104.

The difference information quantized in the procedure of step S105 is locally decoded in the following manner. In step S106, the inverse quantization unit 108 inversely quantizes the quantized orthogonal transform coefficient (also referred to as the quantized coefficient) generated in the procedure of step S105, using properties compatible with the properties of the quantization unit 105. The inverse quantization unit 108 also supplies the quantization parameter used in the inverse quantization to the deblocking filter 111 and the quantization parameter difference detection unit 121.

In step S107, the inverse orthogonal transform unit 109 performs an inverse orthogonal transform on the orthogonal transform coefficient obtained in the procedure of step S106, using properties compatible with the properties of the orthogonal transform unit 104.

In step S108, the arithmetic operation unit 110 adds the predicted image to the locally decoded difference information, and generates a locally decoded image (an image corresponding to the input to the arithmetic operation unit 103).

In step S109, the deblocking filter 111 performs a deblocking filtering operation on the image generated in the procedure of step S108. The flow in the deblocking filtering operation will be described later in detail with reference to FIG. 12. In this manner, block distortions (or distortions in processing-unit regions) are removed.

In step S110, the frame memory 112 stores the image having block distortions removed in the procedure of step S109. It should be noted that images that have not been subjected to filtering operations by the deblocking filter 111 are also supplied from the arithmetic operation unit 110, and are stored into the frame memory 112.

In step S111, the intra prediction unit 114 performs intra prediction operations in intra prediction modes. In step S112, the motion prediction/compensation unit 115 performs inter motion prediction operations to perform motion predictions and motion compensation in inter prediction modes.

In step S113, the selection unit 116 determines an optimum prediction mode based on the respective cost function values that are output from the intra prediction unit 114 and the motion prediction/compensation unit 115. That is, the selection unit 116 selects the predicted image generated by the intra prediction unit 114 or the predicted image generated by the motion prediction/compensation unit 115.

The selection information indicating which predicted image has been selected is supplied to the intra prediction unit 114 or the motion prediction/compensation unit 115, whichever has generated the selected predicted image. When the predicted image generated in the optimum intra prediction mode is selected, the intra prediction unit 114 supplies the information indicating the optimum intra prediction mode (or intra prediction mode information) to the lossless encoding unit 106.

When the predicted image generated in the optimum inter prediction mode is selected, the motion prediction/compensation unit 115 outputs the information indicating the optimum inter prediction mode, as well as information according to the optimum inter prediction mode, if necessary, to the lossless encoding unit 106. The information according to the optimum inter prediction mode may be motion vector information, flag information, reference frame information, or the like.

In step S114, the lossless encoding unit 106 encodes the transform coefficient quantized in the procedure of step S105. That is, lossless encoding such as variable-length encoding or arithmetic encoding is performed on the difference image (a second-order difference image in the case of an inter prediction).

The lossless encoding unit 106 also encodes the information (syntax elements) about the prediction mode of the predicted image selected in the procedure of step S113, and adds the encoded information to the encoded data obtained by encoding the difference image. That is, the lossless encoding unit 106 also encodes information in accordance with the intra prediction mode information supplied from the intra prediction unit 114 or the optimum inter prediction mode supplied from the motion prediction/compensation unit 115, and adds the encoded information to the encoded data. The lossless encoding unit 106 also supplies the syntax elements to the deblocking filter 111 and the quantization parameter difference detection unit 121.

In step S115, the accumulation buffer 107 accumulates the encoded data that is output from the lossless encoding unit 106. The encoded data accumulated in the accumulation buffer 107 is read where appropriate, and is transmitted to the decoding side via a transmission path.

In step S116, based on the compressed images accumulated in the accumulation buffer 107 in the procedure of step S115, the rate control unit 117 controls the quantization operation rate of the quantization unit 105 so as not to cause an overflow or under flow.

When the procedure of step S116 is completed, the encoding operation comes to an end.

[Deblocking Filtering Operation Flow]

Figure 12:
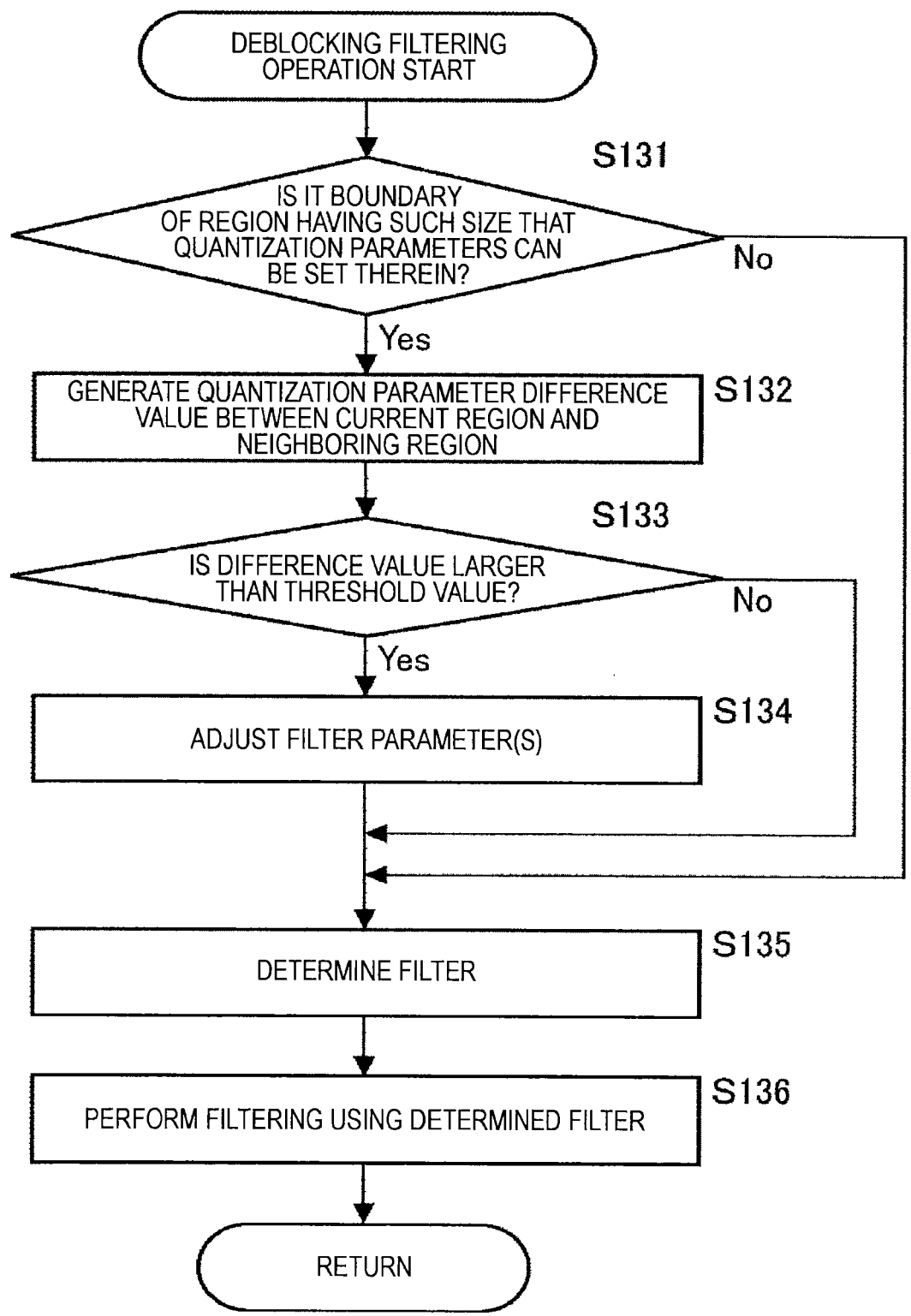
FIG. 12 is a flowchart for explaining an example flow in a deblocking filtering operation.

Referring now to the flowchart shown in FIG. 12, an example flow in the deblocking filtering operation to be performed in step S109 in FIG. 10 is described.

From the inverse quantization unit 108, a current region quantization parameter is accumulated in the current quantization parameter buffer 152, and a neighboring region quantization parameter is accumulated in the neighboring quantization parameter buffer 151.

In step S131, the difference generation unit 153 determines whether the boundary between the current region and the neighboring region is a boundary of a region having such a size that quantization parameters can be set therein. For example, the boundary between the current region C and the neighboring region N2 adjacent to the upper edge of the current region C in FIG. 9 is a boundary of the region M in which quantization parameters can be set. Therefore, in this case, it is determined in step S131 that the boundary between the current region and the neighboring region is a boundary of a region having such a size that quantization parameters can be set therein. The operation then moves on to step S132.

In step S132, the difference generation unit 153 generates a quantization parameter difference value between the current region and the neighboring region. The generated quantization parameter difference value is supplied to the threshold value determination unit 154.

In step S133, the threshold value determination unit 154 determines whether the quantization parameter difference value is larger than a threshold value. If the quantization parameter difference value is determined to be larger than the threshold value in step S133, the operation moves on to step S134. At this point, the threshold value determination unit 154 supplies a control signal indicating that the quantization parameter difference value is larger than the threshold value, to the α/β determination unit 161 and the Bs determination unit 162.

In step S134, the α/β determination unit 161 or the Bs determination unit 162 adjusts a filter parameter.

Based on the current region quantization parameter from the inverse quantization unit 108, the α/β determination unit 161 determines the values of α and β of the above described expression (2) as an adjustment of the filter parameters. At this point, if the control signal from the threshold value determination unit 154 indicates that the difference value is larger than the threshold value, the α/β determination unit 161 associates "QP+Δ", instead of QP, as the quantization parameter with α and β in the above described tables shown in A in FIG. 6 and B in FIG. 6.

Alternatively, by referring to the syntax elements from the lossless encoding unit 106, the Bs determination unit 162 determines the value of Bs as an adjustment of the filter parameters, as shown in the table in FIG. 4. At this point, if the control signal from the threshold value determination unit 154 indicates that the difference value is larger than the threshold value, the Bs determination unit 162 uses "Bs+1", for example, instead of Bs.

The α/β determination unit 161 supplies the determined values of α and β as one of the filter parameters to the filter determination unit 163. The Bs determination unit 162 supplies the determined value of Bs as one of the filter parameters to the filter determination unit 163.

The filter parameter adjustment in step S134 may be performed by both the α/β determination unit 161 and the Bs determination unit 162, or may be performed by one of the two units. If the adjustment is performed by one of the two units, the other unit supplies a regular filter parameter that has not been adjusted, to the filter determination unit 163.

Alternatively, in step S134, the larger one of the quantization parameters of regions adjacent to each other may be used as the quantization parameter for the deblocking filtering operation, as described above.

If the quantization parameter difference value is determined to be equal to or smaller than the threshold value in step S133, the procedure in step S134 is skipped. At this point, the threshold value determination unit 154 supplies a control signal indicating that the quantization parameter difference value is equal to or smaller than the threshold value, to the α/β determination unit 161 and the Bs determination unit 162. The α/β determination unit 161 and the Bs determination unit 162 then supply regular filter parameters that have not been adjusted, to the filter determination unit 163.

Specifically, based on the current region quantization parameter from the inverse quantization unit 108, the α/β determination unit 161 determines the values of α and β of the above described expression (2) as an adjustment of the filter parameters. By referring to the syntax elements from the lossless encoding unit 106, the Bs determination unit 162 determines the value of Bs as an adjustment of the filter parameters, as shown in the table in FIG. 4.

Meanwhile, the boundary between the current region C and the neighboring region N3 adjacent to the right edge of the current region C in FIG. 9 is located in the region M in which quantization parameters can be set, and is not regarded as a boundary. Therefore, in this case, it is determined in step S131 that the boundary between the current region and the neighboring region is not a boundary of a region having such a size that quantization parameters can be set therein, and steps S132 through S134 are skipped. The operation then moves on to step S135.

That is, in this case, any difference value is not generated, and there are no control signals. Therefore, the α/β determination unit 161 and the Bs determination unit 162 supply regular filter parameters that have not been adjusted, to the filter determination unit 163.

In step S135, the filter determination unit 163 determines a filter, using the filter parameters from the α/β determination unit 161 and the Bs determination unit 162, and the pixel values yet to be subjected to deblocking filtering. That is, the filter determination unit 163 determines whether strong filtering is to be performed, whether weak filtering is to be performed, or whether no filtering is to be performed on the boundary between the current region and the neighboring region, and determines the filter that is to be used in the filtering.

The filter determination unit 163 supplies control information about the determined filter and the pixel values yet to be subjected to deblocking filtering, to the filtering unit 164.

In step S136, based on the control information about the filter determined by the filter determination unit 163, the filtering unit 164 filters the pixel values yet to be subjected to deblocking filtering. The filtering unit 164 outputs the pixel values subjected to the deblocking filtering to the frame memory 112.

As described above, when the quantization parameter difference value between the current region and the neighboring region is large, strong deblocking filtering can be performed by increasing the filter strength. In this manner, an appropriate block distortion removal can be performed.

<2. Second Embodiment>
[Image Decoding Device]

Figure 13:
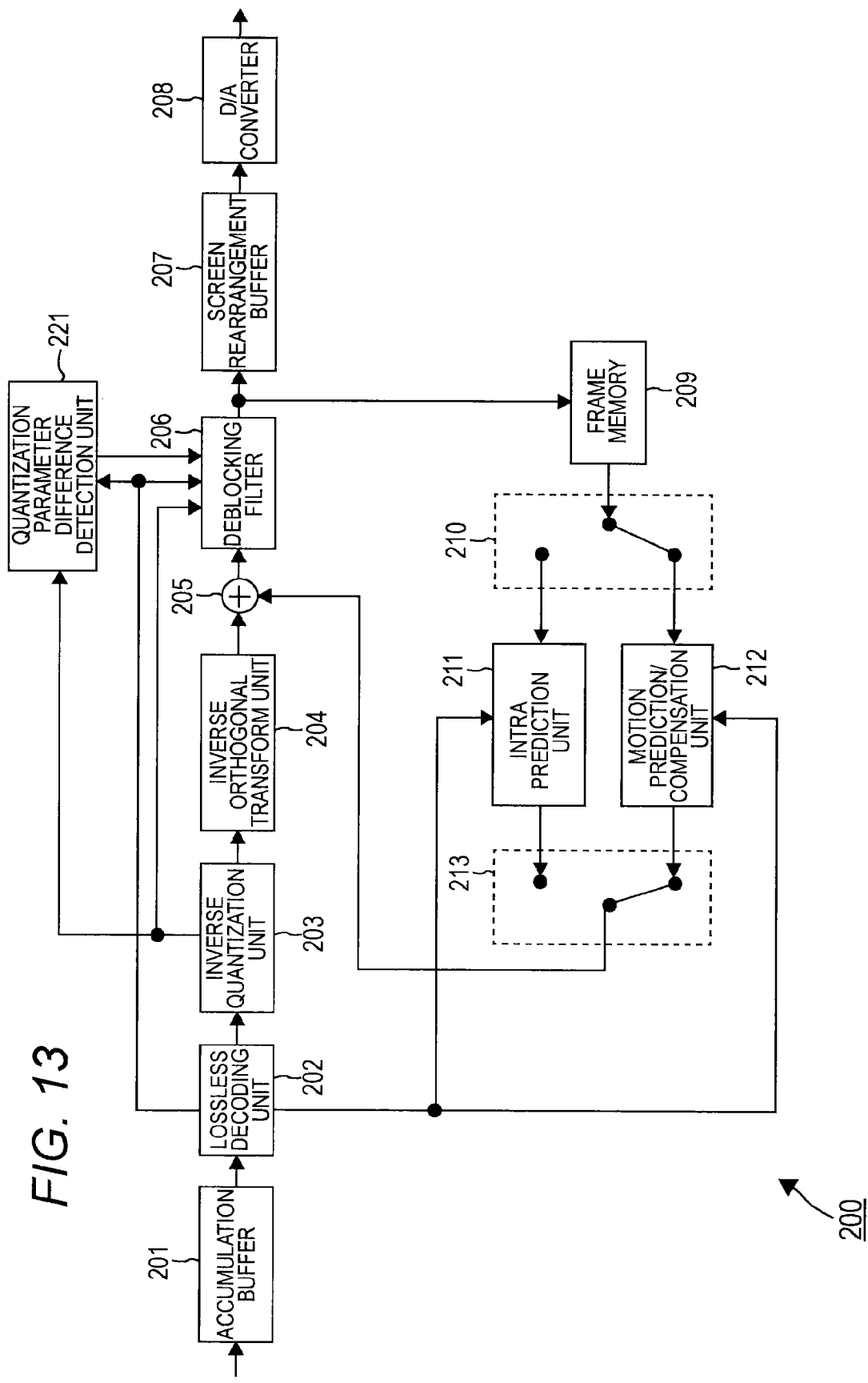
FIG. 13 is a block diagram showing a typical example structure of an image decoding device.

FIG. 13 shows the structure of an embodiment of an image decoding device as an image processing device to which this disclosure is applied. The image decoding device 200 shown in FIG. 13 is a decoding device that is compatible with the image encoding device 100 shown in FIG. 1.

Data encoded by the image encoding device 100 is transmitted to the image decoding device 200 compatible with the image encoding device 100 via a predetermined transmission path, and is then decoded.

As shown in FIG. 13, the image decoding device 200 includes an accumulation buffer 201, a lossless decoding unit 202, an inverse quantization unit 203, an inverse orthogonal transform unit 204, an arithmetic operation unit 205, a deblocking filter 206, a screen rearrangement buffer 207, and a D/A converter 208. The image decoding device 200 also includes a frame memory 209, a selection unit 210, an intra prediction unit 211, a motion prediction/compensation unit 212, and a selection unit 213.

The image decoding device 200 further includes a quantization parameter difference detection unit 221.

The accumulation buffer 201 accumulates transmitted encoded data. The encoded data has been encoded by the image encoding device 100. The lossless decoding unit 202 decodes the encoded data read from the accumulation buffer 201 at a predetermined time, by a method compatible with the encoding method used by the lossless encoding unit 106 shown in FIG. 1. The lossless decoding unit 202 also supplies decoded syntax elements to the deblocking filter 206 and the quantization parameter difference detection unit 221.

The inverse quantization unit 203 inversely quantizes the coefficient data (the quantized coefficient) decoded by the lossless decoding unit 202, by a method compatible with the quantization method used by the quantization unit 105 shown in FIG. 1. Specifically, using a quantization parameter supplied from the image encoding device 100, the inverse quantization unit 203 inversely quantizes the quantized coefficient by the same method as the method used by the inverse quantization unit 108 shown in FIG. 1.

The inverse quantization unit 203 supplies the inversely-quantized coefficient data, or an orthogonal transform coefficient, to the inverse orthogonal transform unit 204. The inverse quantization unit 203 also supplies the quantization parameter used in the inverse quantization to the deblocking filter 206 and the quantization parameter difference detection unit 221. The inverse orthogonal transform unit 204 subjects the orthogonal transform coefficient to an inverse orthogonal transform by a method compatible with the orthogonal transform method used by the orthogonal transform unit 104 shown in FIG. 1, and obtains decoded residual error data corresponding to the residual error data from the time prior to the orthogonal transform performed by the image encoding device 100.

The decoded residual error data obtained through the inverse orthogonal transform is supplied to the arithmetic operation unit 205. A predicted image is also supplied to the arithmetic operation unit 205 from the intra prediction unit 211 or the motion prediction/compensation unit 212 via the selection unit 213.

The arithmetic operation unit 205 adds the decoded residual error data to the predicted image, and obtains decoded image data corresponding to the image data from the time prior to the predicted image subtraction performed by the arithmetic operation unit 103 of the image encoding device 100. The arithmetic operation unit 205 supplies the decoded image data to the deblocking filter 206.

The deblocking filter 206 basically has the same structure as the deblocking filter 111 of the image encoding device 100. The deblocking filter 206 removes block distortions from the decoded image by performing a deblocking filtering operation where necessary.

Before doing so, the deblocking filter 206 refers to the quantization parameter from the inverse quantization unit 203 and the syntax elements from the lossless decoding unit 202 in accordance with a control signal from the quantization parameter difference detection unit 221, and adjusts the parameters for the deblocking filtering operation. The deblocking filter 206 supplies the filtering operation result to the screen rearrangement buffer 207.

The screen rearrangement buffer 207 performs image rearrangement. Specifically, the frame sequence rearranged in the encoding order by the screen rearrangement buffer 102 shown in FIG. 1 is rearranged in the original displaying order. The D/A converter 208 performs a D/A conversion on the images supplied from the screen rearrangement buffer 207, and outputs the converted images to a display (not shown) to display the images.

The output of the deblocking filter 206 is further supplied to the frame memory 209.

The frame memory 209, the selection unit 210, the intra prediction unit 211, the motion prediction/compensation unit 212, and the selection unit 213 are equivalent to the frame memory 112, the selection unit 113, the intra prediction unit 114, the motion prediction/compensation unit 115, and the selection unit 116 of the image encoding device 100, respectively.

The selection unit 210 reads, from the frame memory 209, an image to be inter-processed and an image to be referred to, and supplies the images to the motion prediction/compensation unit 212. The selection unit 210 also reads an image to be used for intra predictions from the frame memory 209, and supplies the image to the intra prediction unit 211.

Information that has been obtained by decoding the header information and indicates an intra prediction mode or the like is supplied, where appropriate, from the lossless decoding unit 202 to the intra prediction unit 211. Based on the information, the intra prediction unit 211 generates a predicted image from the reference image obtained from the frame memory 209, and supplies the generated predicted image to the selection unit 213.

The information obtained by decoding the header information (prediction mode information, motion vector information, reference frame information, a flag, respective parameters, and the like) is supplied from the lossless decoding unit 202 to the motion prediction/compensation unit 212.

Based on the information supplied from the lossless decoding unit 202, the motion prediction/compensation unit 212 generates a predicted image from the reference image obtained from the frame memory 209, and supplies the generated predicted image to the selection unit 213.

The selection unit 213 selects the predicted image generated by the motion prediction/compensation unit 212 or the predicted image generated by the intra prediction unit 211, and supplies the selected predicted image to the arithmetic operation unit 205.

The quantization parameter difference detection unit 221 basically has the same structure as the quantization parameter difference detection unit 121 of the image encoding device 100. The quantization parameter difference detection unit 221 generates a quantization parameter difference value between a current region and a neighboring region adjacent to the current region by referring to the syntax elements from the lossless decoding unit 202 and the quantization parameter from the inverse quantization unit 203. The quantization parameter difference detection unit 221 compares the generated difference value with a predetermined threshold value, and supplies a control signal based on the comparison result to the deblocking filter 206.

[Example Structures of the Deblocking Filter and the Quantization Parameter Difference Detection Unit]

Figure 14:
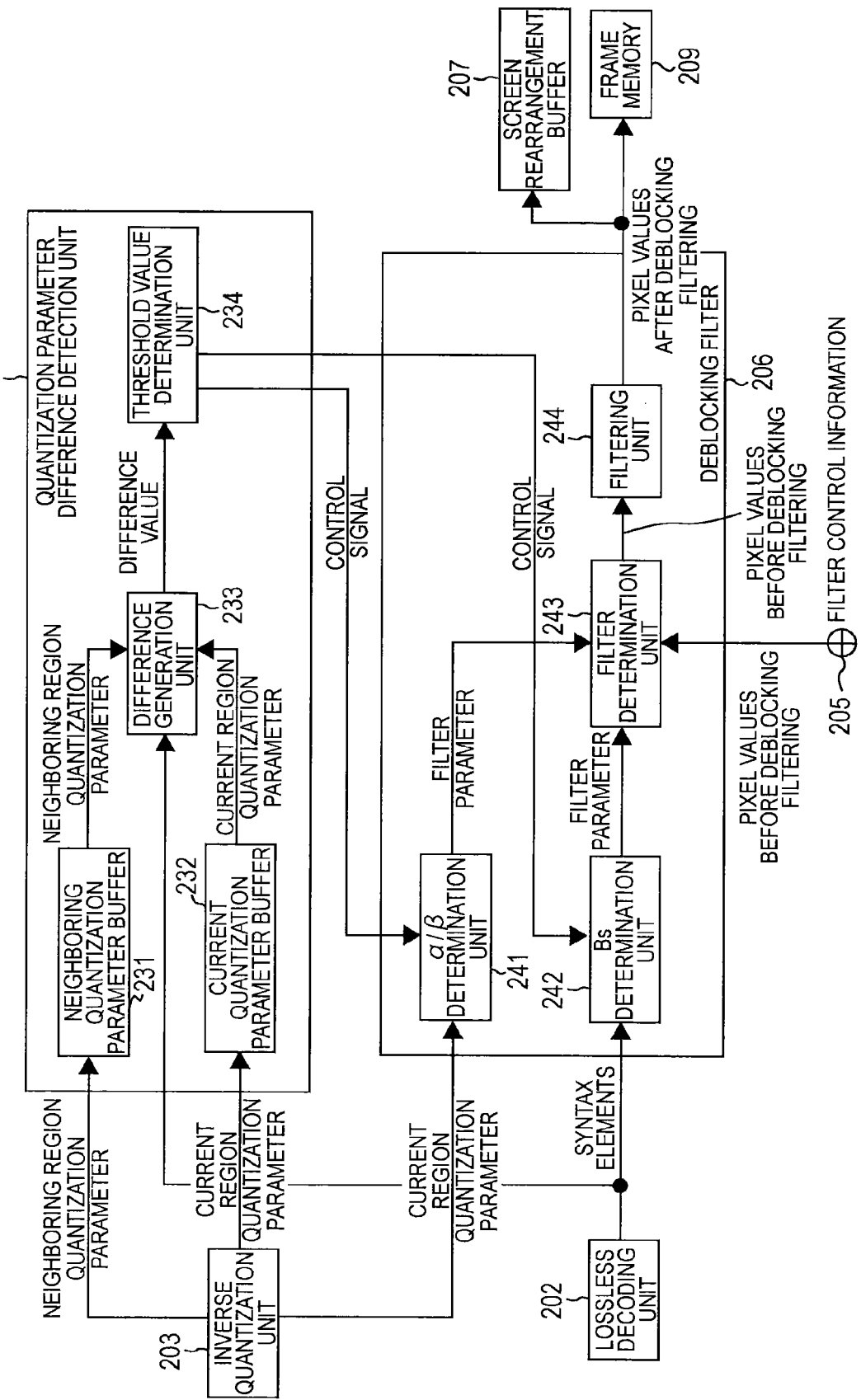
FIG. 14 is a block diagram showing example structures of the quantization parameter difference detection unit and the deblocking filter.

Next, the respective components of the image decoding device 200 are described. FIG. 14 is a block diagram showing example structures of the deblocking filter 206 and the quantization parameter difference detection unit 221.

In the example shown in FIG. 14, the deblocking filter 206 has a structure that includes an α/β determination unit 241, a Bs determination unit 242, a filter determination unit 243, and a filtering unit 244.

The quantization parameter difference detection unit 221 has a structure that includes a neighboring quantization parameter buffer 231, a current quantization parameter buffer 232, a difference generation unit 233, and a threshold value determination unit 234.

A neighboring region quantization parameter from the inverse quantization unit 203 is supplied to the neighboring quantization parameter buffer 231. A current region quantization parameter from the inverse quantization unit 203 is supplied to the current quantization parameter buffer 232 and the α/β determination unit 241. Also, syntax elements from the lossless decoding unit 202 are supplied to the difference generation unit 233 and the Bs determination unit 242.

The neighboring quantization parameter buffer 231 basically has the same structure as the neighboring quantization parameter buffer 151 shown in FIG. 10, and accumulates the neighboring region quantization parameter from the inverse quantization unit 203. The current quantization parameter buffer 232 basically has the same structure as the current quantization parameter buffer 152 shown in FIG. 10, and accumulates the current region quantization parameter from the inverse quantization unit 203.

The difference generation unit 233 basically has the same structure as the difference generation unit 153 shown in FIG. 10. Based on the syntax elements from the lossless decoding unit 202, the difference generation unit 233 determines whether the boundary between the current region and the neighboring region is a boundary of a region having such a size that quantization parameters can be set therein. When determining that the region has such a size that quantization parameters can be set therein, the difference generation unit 233 performs the operation described below. When it is determined the region does not have such a size that quantization parameters can be set therein, the operation described below is not performed.

The difference generation unit 233 reads the neighboring region quantization parameter from the neighboring quantization parameter buffer 231, and reads the current region quantization parameter from the current quantization parameter buffer 232. The difference generation unit 233 generates a quantization parameter difference value (the left-hand side of the expression (33)), which is the difference value between the read quantization parameters, and supplies the generated difference value to the threshold value determination unit 234.

The threshold value determination unit 234 basically has the structure as the threshold value determination unit 154 shown in FIG. 10. The threshold value determination unit 234 compares the difference value from the difference generation unit 233 with a threshold value, and supplies a control signal indicating whether the difference value is larger than the threshold value, or whether the boundary easily has block distortions, to the α/β determination unit 241 and the Bs determination unit 242.

The α/β determination unit 241 basically has the same structure as the α/β determination unit 161 shown in FIG. 10. Based on the current region quantization parameter from the inverse quantization unit 203, the α/β determination unit 241 determines the values of α and β of the above described expression (2) as an adjustment of the filter parameters. At this point, if the control signal from the threshold value determination unit 234 indicates that the difference value is larger than the threshold value, the α/β determination unit 241 associates "QP+Δ", instead of QP, as the quantization parameter with α and β in the above described tables shown in A in FIG. 6 and B in FIG. 6.

The α/β determination unit 241 supplies the determined values of α and β as one of the filter parameters to the filter determination unit 243.

The Bs determination unit 242 basically has the same structure as the Bs determination unit 162 shown in FIG. 10. By referring to the syntax elements from the lossless decoding unit 202, the Bs determination unit 242 determines the value of Bs as an adjustment of the filter parameters, as shown in the table in FIG. 4. At this point, if the control signal from the threshold value determination unit 234 indicates that the difference value is larger than the threshold value, the Bs determination unit 242 uses "Bs+1", for example, instead of Bs. Alternatively, if the control signal from the threshold value determination unit 234 indicates that the difference value is larger than the threshold value, the Bs determination unit 242 uses Bs=4.

The Bs determination unit 242 supplies the determined value of Bs as one of the filter parameters to the filter determination unit 243.

Pixel values yet to be subjected to deblocking filtering are input from the arithmetic operation unit 205 to the filter determination unit 243. The filter determination unit 243 basically has the same structure as the filter determination unit 163 shown in FIG. 10. The filter determination unit 243 determines a filter, using the filter parameters from the α/β determination unit 241 and the Bs determination unit 242, and the pixel values yet to be subjected to deblocking filtering. That is, the filter determination unit 243 determines whether strong filtering is to be performed, whether weak filtering is to be performed, or whether no filtering is to be performed on the boundary between the current region and the neighboring region, and determines the filter that is to be used in the filtering.

The filter determination unit 243 supplies control information about the determined filter and the pixel values yet to be subjected to deblocking filtering, to the filtering unit 244.

The filtering unit 244 basically has the same structure as the filtering unit 164 shown in FIG. 10. Based on the control information about the filter determined by the filter determination unit 243, the filtering unit 244 performs a deblocking filtering operation on the pixel values yet to be subjected to deblocking filtering. The filtering unit 244 outputs the pixel values subjected to the deblocking filtering to the screen rearrangement buffer 207 and the frame memory 209.

[Decoding Operation Flow]

Next, the flow in each operation to be performed by the above described image decoding device 200 is described. Referring first to the flowchart shown in FIG. 15, an example flow in a decoding operation is described.

When the decoding operation is started, the accumulation buffer 201 accumulates transmitted encoded data in step S201. In step S202, the lossless decoding unit 202 decodes the encoded data supplied from the accumulation buffer 201. Specifically, I-pictures, P-pictures, and B-pictures encoded by the lossless encoding unit 106 shown in FIG. 1 are decoded.

At this point, motion vector information, reference frame information, prediction mode information (an intra prediction mode or an inter prediction mode), and information about syntax elements such as a flag and a quantization parameter are decoded.

In a case where the prediction mode information is intra prediction mode information, the prediction mode information is supplied to the intra prediction unit 211. In a case where the prediction mode information is inter prediction mode information, the prediction mode information and the corresponding motion vector information are supplied to the motion prediction/compensation unit 212. Meanwhile, the syntax elements are supplied to the deblocking filter 206 and the quantization parameter difference detection unit 221.

In step S203, the inverse quantization unit 203 inversely quantizes a quantized orthogonal transform coefficient obtained as a result of the decoding by the lossless decoding unit 202. In step S204, the inverse orthogonal transform unit 204 performs an inverse orthogonal transform on the orthogonal transform coefficient obtained through the inverse quantization performed by the inverse quantization unit 203, by a method compatible with the method used by the orthogonal transform unit 104 shown in FIG. 1. As a result, the difference information corresponding to the input to the orthogonal transform unit 104 (or the output from the arithmetic operation unit 103) shown in FIG. 1 is decoded.

In step S205, the arithmetic operation unit 205 adds a predicted image to the difference information obtained in the procedure of step S204. In this manner, the original image data is decoded.

In step S206, the deblocking filter 206 performs filtering on the decoded image obtained in the procedure of step S205, where appropriate. The flow in the deblocking filtering operation will be described later in detail with reference to FIG. 16. As a result, block distortions are properly removed from the decoded image.

In step S207, the frame memory 209 stores the decoded images subjected to the filtering.

In step S208, the intra prediction unit 211 or the motion prediction/compensation unit 212 performs an image prediction operation in accordance with the prediction mode information supplied from the lossless decoding unit 202.

Specifically, in a case where intra prediction mode information is supplied from the lossless decoding unit 202, the intra prediction unit 211 performs an intra prediction operation in an intra prediction mode. In a case where inter prediction mode information is supplied from the lossless decoding unit 202, the motion prediction/compensation unit 212 performs a motion prediction operation in an inter prediction mode.

In step S209, the selection unit 213 selects a predicted image. Specifically, the predicted image generated by the intra prediction unit 211, or the predicted image generated by the motion prediction/compensation unit 212 is supplied to the selection unit 213. The selection unit 213 selects the supplied predicted image, and supplies the predicted image to the arithmetic operation unit 205. This predicted image is added to the difference information in the procedure of step S205.

In step S210, the screen rearrangement buffer 207 rearranges the frames of the decoded image data. Specifically, in the decoded image data, the order of frames rearranged for encoding by the screen rearrangement buffer 102 of the image encoding device 100 (FIG. 1) is rearranged in the original displaying order.

In step S211, the D/A converter 208 performs a D/A conversion on the decoded image data having the frames rearranged by the screen rearrangement buffer 207. The decoded image data is output to a display (not shown), and the images are displayed.

[Deblocking Filtering Operation Flow]

Figure 15:
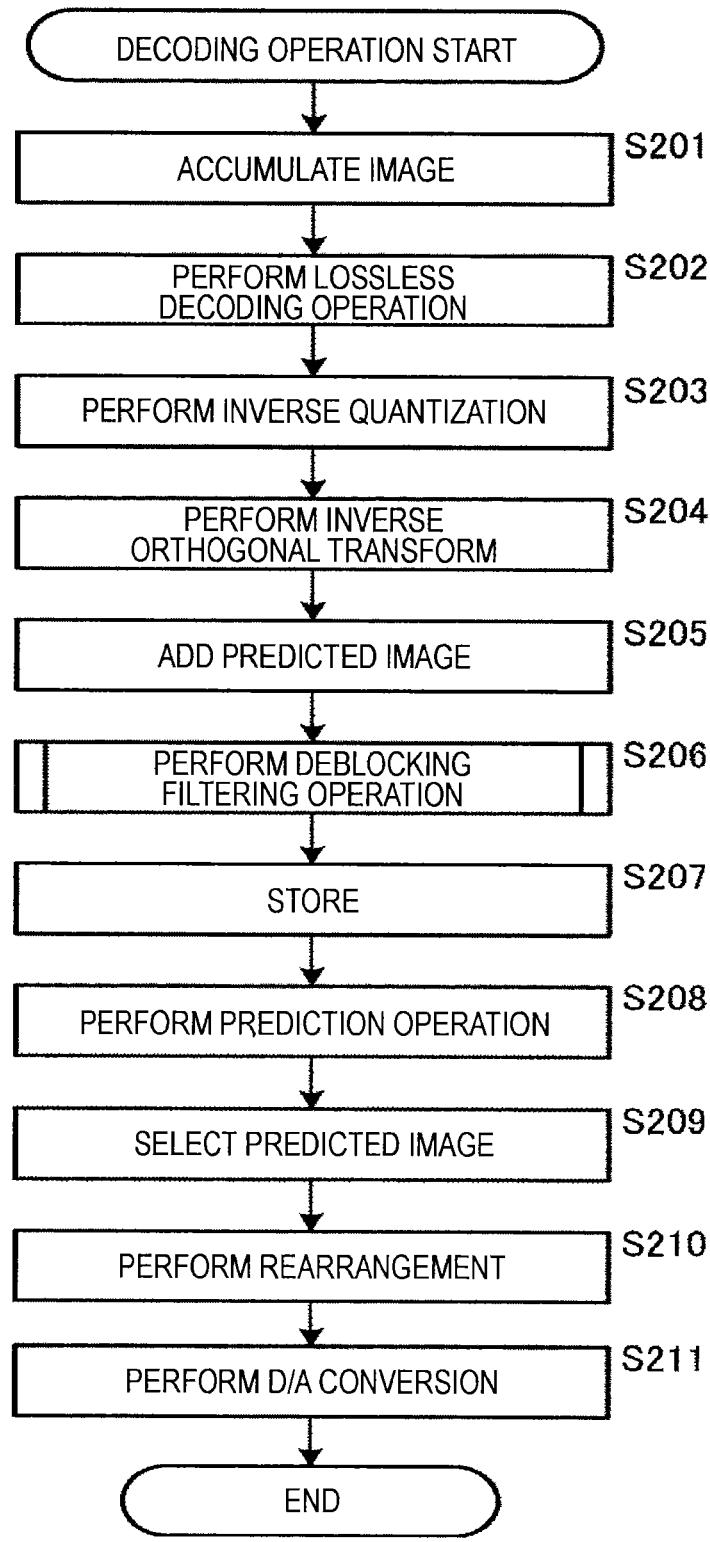
FIG. 15 is a flowchart for explaining an example flow in a decoding operation.
Figure 16:
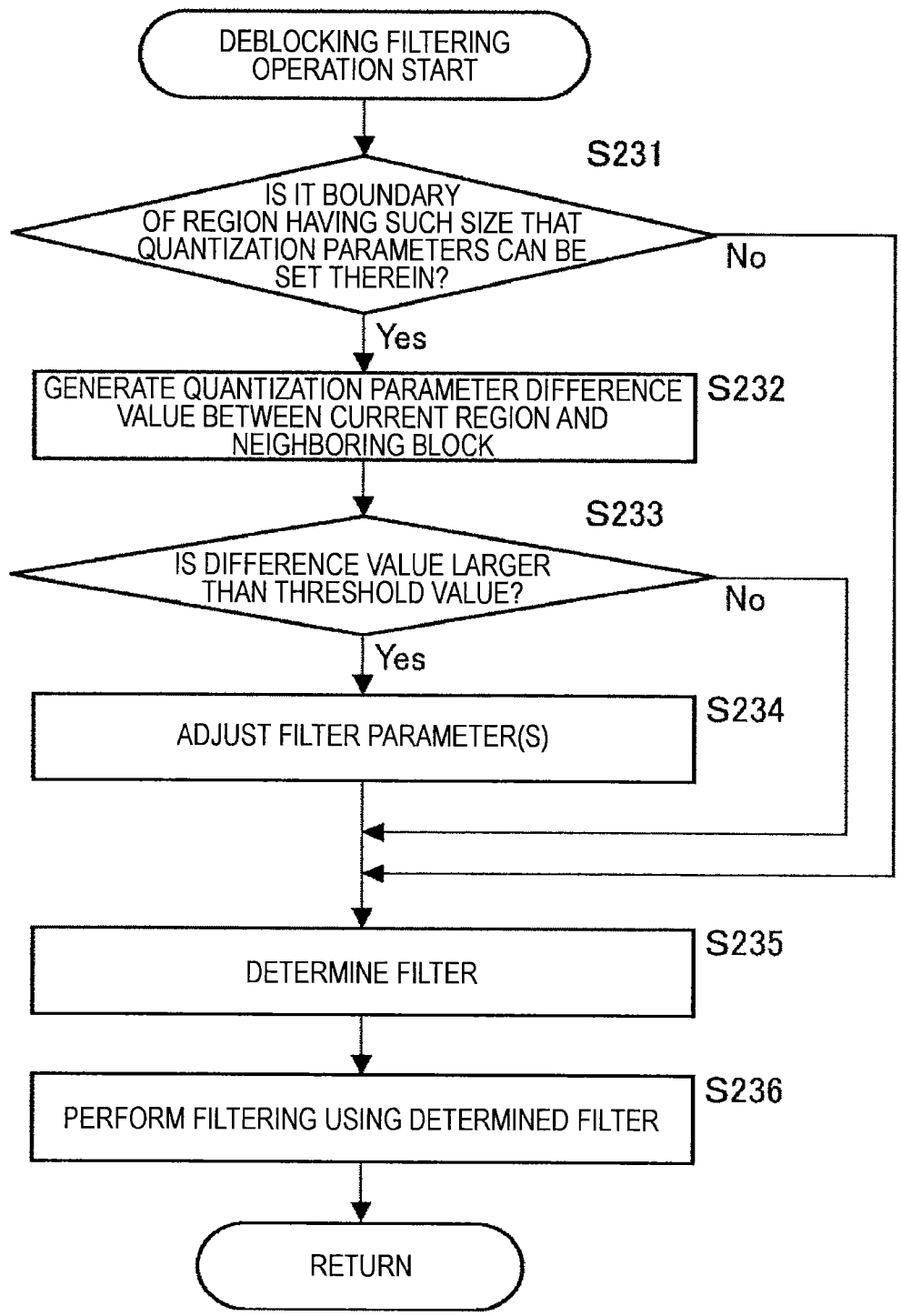
FIG. 16 is a flowchart for explaining an example flow in a deblocking filtering operation.

Referring now to the flowchart shown in FIG. 16, an example flow in the deblocking filtering operation to be performed in step S206 in FIG. 15 is described. Steps S231 through S236 in FIG. 16 are basically the same procedures as those in steps S131 through S136 in FIG. 12.

From the inverse quantization unit 203, a current region quantization parameter is accumulated in the current quantization parameter buffer 232, and a neighboring region quantization parameter is accumulated in the neighboring quantization parameter buffer 231.

In step S231, the difference generation unit 233 determines whether the boundary between the current region and the neighboring region is a boundary of a region having such a size that quantization parameters can be set therein. For example, the boundary between the current region C and the neighboring region N2 adjacent to the upper edge of the current region C in FIG. 9 is a boundary of the region M in which quantization parameters can be set. Therefore, in this case, it is determined in step S231 that the boundary between the current region and the neighboring region is a boundary of a region having such a size that quantization parameters can be set therein. The operation then moves on to step S232.

In step S232, the difference generation unit 233 generates a quantization parameter difference value between the current region and the neighboring region. The generated quantization parameter difference value is supplied to the threshold value determination unit 234.

In step S233, the threshold value determination unit 234 determines whether the quantization parameter difference value is larger than a threshold value. If the quantization parameter difference value is determined to be larger than the threshold value in step S233, the operation moves on to step S234. At this point, the threshold value determination unit 234 supplies a control signal indicating that the quantization parameter difference value is larger than the threshold value, to the α/β determination unit 241 and the Bs determination unit 242.

In step S234, the α/β determination unit 241 or the Bs determination unit 242 adjusts a filter parameter.

Based on the current region quantization parameter from the inverse quantization unit 203, the α/β determination unit 241 determines the values of α and β of the above described expression (2) as an adjustment of the filter parameters. At this point, if the control signal from the threshold value determination unit 234 indicates that the difference value is larger than the threshold value, the α/β determination unit 241 associates "QP+Δ", instead of QP, as the quantization parameter with α and β in the above described tables shown in A in FIG. 6 and B in FIG. 6.

Alternatively, by referring to the syntax elements from the lossless decoding unit 202, the Bs determination unit 242 determines the value of Bs as an adjustment of the filter parameters, as shown in the table in FIG. 4. At this point, if the control signal from the threshold value determination unit 234 indicates that the difference value is larger than the threshold value, the Bs determination unit 242 uses "Bs+1", for example, instead of Bs.

The α/β determination unit 241 supplies the determined values of α and β as one of the filter parameters to the filter determination unit 243. The Bs determination unit 242 supplies the determined value of Bs as one of the filter parameters to the filter determination unit 243.

The filter parameter adjustment in step S234 may be performed by both the α/β determination unit 241 and the Bs determination unit 242, or may be performed by one of the two units. If the adjustment is performed by one of the two units, the other unit supplies a regular filter parameter that has not been adjusted, to the filter determination unit 243.

Alternatively, in step S234, the larger one of the quantization parameters of regions adjacent to each other may be used as the quantization parameter for the deblocking filtering operation, as described above.

If the quantization parameter difference value is determined to be equal to or smaller than the threshold value in step S233, the procedure in step S234 is skipped. At this point, the threshold value determination unit 234 supplies a control signal indicating that the quantization parameter difference value is equal to or smaller than the threshold value, to the α/β determination unit 241 and the Bs determination unit 242. The α/β determination unit 241 and the Bs determination unit 242 then supply regular filter parameters that have not been adjusted, to the filter determination unit 243.

Specifically, based on the current region quantization parameter from the inverse quantization unit 203, the α/β determination unit 241 determines the values of α and β of the above described expression (2) as an adjustment of the filter parameters. By referring to the syntax elements from the lossless decoding unit 202, the Bs determination unit 242 determines the value of Bs as an adjustment of the filter parameters, as shown in the table in FIG. 4.

Meanwhile, the boundary between the current region C and the neighboring region N3 adjacent to the right edge of the current region C in FIG. 9 is located in the region M in which quantization parameters can be set, and is not regarded as a boundary. Therefore, in this case, it is determined in step S231 that the boundary between the current region and the neighboring region is not a boundary of a region having such a size that quantization parameters can be set therein, and steps S232 through S234 are skipped. The operation then moves on to step S235.

That is, in this case, any difference value is not generated, and there are no control signals. Therefore, the α/β determination unit 241 and the Bs determination unit 242 supply regular filter parameters that have not been adjusted, to the filter determination unit 243.

In step S235, the filter determination unit 243 determines a filter, using the filter parameters from the α/β determination unit 241 and the Bs determination unit 242, and the pixel values yet to be subjected to deblocking filtering. That is, the filter determination unit 243 determines whether strong filtering is to be performed, whether weak filtering is to be performed, or whether no filtering is to be performed on the boundary between the current region and the neighboring region, and determines the filter that is to be used in the filtering.

The filter determination unit 243 supplies control information about the determined filter and the pixel values yet to be subjected to deblocking filtering, to the filtering unit 244.

In step S236, based on the control information about the filter determined by the filter determination unit 243, the filtering unit 244 performs a deblocking filtering operation on the pixel values yet to be subjected to deblocking filtering.

The filtering unit 244 outputs the pixel values subjected to the deblocking filtering to the screen rearrangement buffer 207 and the frame memory 209.

As described above, when the quantization parameter difference value between the current region and the neighboring region is large, strong deblocking filtering can be performed by adjusting the filter. In this manner, an appropriate block distortion removal can be performed.

<3. Third Embodiment>
[Example Operation Compatible with the IPCM Mode]

Figure 17:
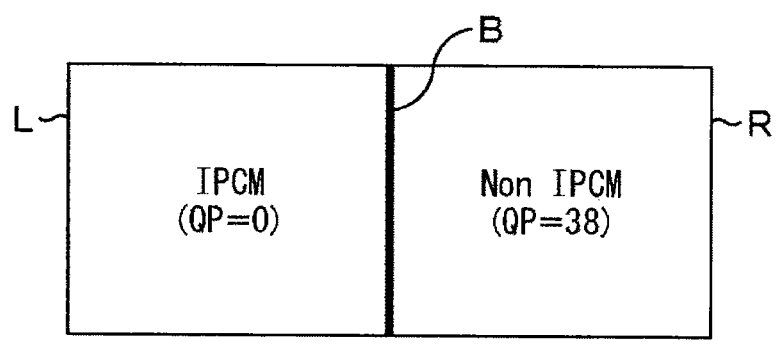
FIG. 17 is a diagram for explaining an operation compatible with the IPCM mode.

Referring now to FIG. 17, an example case where there is an IPCM mode region in a current region or a neighboring region adjacent to the current region via a boundary is described. The IPCM mode is an uncompressed mode, and is disclosed in JP 3992303 B1 and JP 4687998 B1, for example.

For example, a region L and a region R are adjacent to each other, with a boundary B being interposed in between. The region L is a block in the IPCM mode, and the region R is a block in a non-IPCM mode.

As described above, according to H.264/AVC, the strength of the filtering to be performed on the boundary B is determined based on the average of the quantization parameters of the neighboring regions adjacent to each other, with the boundary B being interposed in between. The quantization parameter of a region in the IPCM mode is 0.

Therefore, in a case where the quantization parameter QP of the region R is 38, for example, weak filtering is performed on the boundary B, since the strength of the filtering is determined based on the average of the quantization parameters QP of the region L and the region R, though degradation easily appears in the regions. However, as the region L is in the IPCM mode, filtering is performed only on the region R side in the boundary B.

In view of this, for the region R, the deblocking filter 111 uses QP=38, which is the quantization parameter of the region R, as the quantization parameter for the deblocking filtering operation. That is, when a neighboring region is in the IPCM mode, an example of the above described third method is implemented.

Referring to the above described functional blocks shown in FIG. 10, the encoding side is now specifically described. The syntax elements (mode information) are also supplied to the threshold value determination unit 154, for example. By referring to the mode information, the threshold value determination unit 154 determines whether the region L or the region R is in the IPCM mode, and supplies a control signal indicating whether one of the regions is in the IPCM mode to the α/β determination unit 161. In a case where the region L is in the IPCM mode, and the control signal indicates the IPCM mode, for example, the α/β determination unit 161 determines the values of α and β of the above described expression (2) by using the quantization parameter of the region R. By doing so, the filter determination unit 163 can determine a stronger filter for the boundary B than in the case of H.264/AVC.

Further, referring to the above described functional blocks shown in FIG. 14, the decoding side is specifically described. The syntax elements (mode information) are also supplied to the threshold value determination unit 234, for example. By referring to the mode information, the threshold value determination unit 234 determines whether the region L or the region R is in the IPCM mode, and supplies a control signal indicating whether one of the regions is in the IPCM mode to the α/β determination unit 241. In a case where the region L is in the IPCM mode, and the control signal indicates the IPCM mode, for example, the α/β determination unit 241 determines the values of α and β of the above described expression (2) by using the quantization parameter of the region R. By doing so, the filter determination unit 243 can determine a stronger filter for the boundary B than in the case of H.264/AVC.

In the above described example, the region L is in the IPCM mode. In a case where the region R is in the IPCM mode, however, the values of α and β of the above described expression (2) are determined by using the quantization parameter of the region L.

As described above, in a case where either a neighboring region or a current region is in the IPCM mode, the boundary QP to be an input to the deblocking filter is the quantization parameter of the other one of the regions. In this manner, deblocking filtering of an appropriate strength for the current region can be performed, even if a neighboring region is in the IPCM mode.

Although H.264/AVC has been described as an example in the above description, standardization of an encoding method called HEVC (High Efficiency Video Coding) is now in progress, so as to achieve a higher encoding efficiency than that of H.264/AVC. In the following, operations based on the encoding method compliant with the HEVC standards (hereinafter referred to as the HEVC method) will be described.

For example, according to the HEVC method, "beta" and "tc" having the same functions as α and β are used as the offset values (threshold values) for determining the filtering strength of deblocking filtering.

<4. Fourth Embodiment>
[Example Operation Compatible with a Quantization Matrix]

Deblocking filtering is performed based on the quantization parameter QP contained in encoded data (compressed image information) transmitted from the encoding side. Referring again to FIG. 8, this aspect is specifically described.

In a conventional case, the boundary QP for determining the parameters beta and tc (equivalent to α and β of H.264/AVC) is determined according to the following expression (34) using the quantization parameter QPc of the current region C and the quantization parameter QPN of the neighboring region N adjacent to the current region C, with a boundary being interposed in between.

$$\text{Boundary } QP = (QPc + QPN + 1) >> 1 \tag{34}$$

In a case where a quantization matrix (a scaling list) contained in encoded data is transmitted, the values to be actually divided are corrected by the scaling list. In other words, the influence of a scaling list is not taken into account in determining the boundary QP according to the expression (34).

It is DC components that strongly affect block distortions. To detect block distortions, information about the DC components of a scaling list is essential. In view of this, the image encoding device 100 shown in FIG. 1 and the image decoding device 200 shown in FIG. 13 correct transmitted QP with a scaling list, and use the corrected QP in determining the boundary QP to be used in determining filtering strength.

Figure 18:
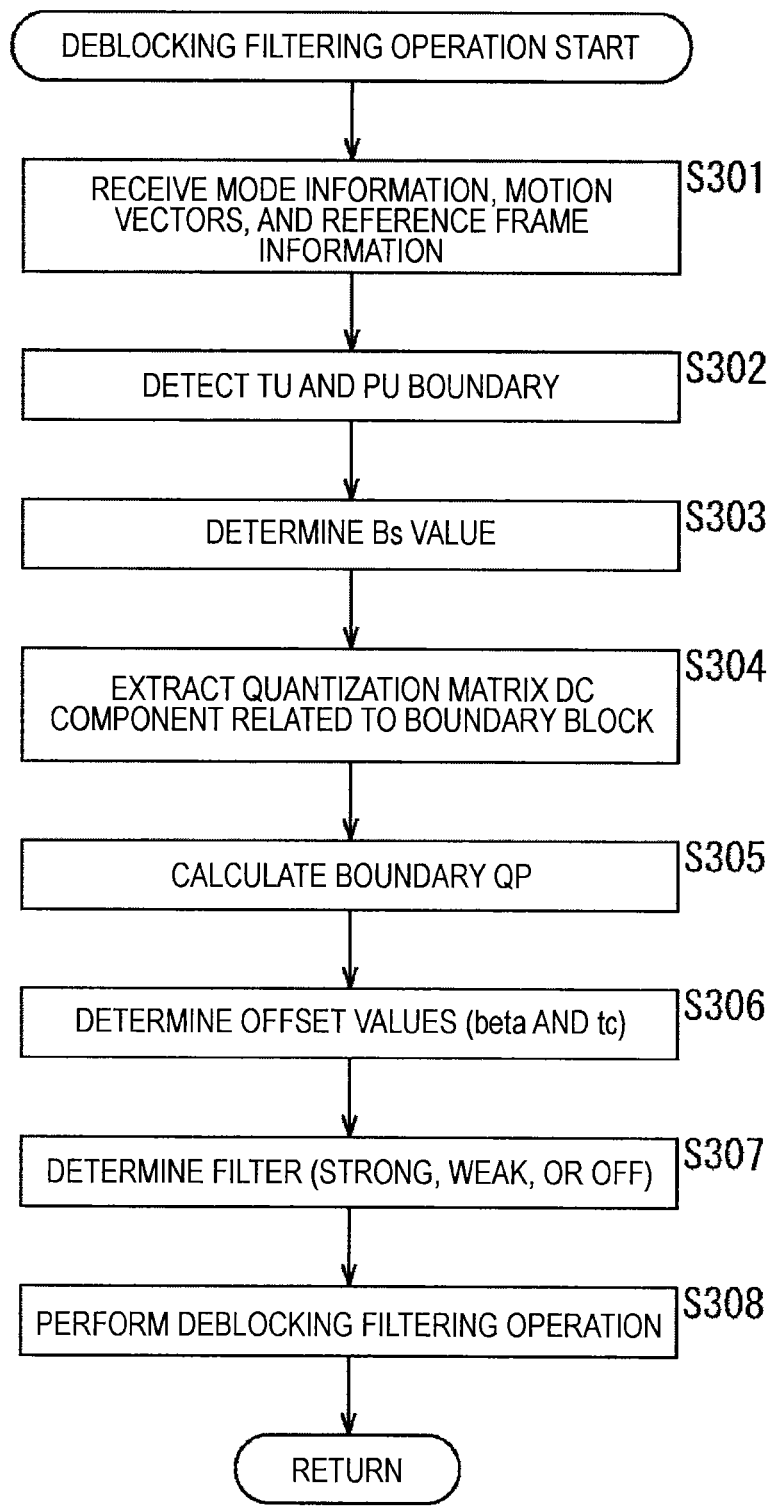
FIG. 18 is a flowchart for explaining an example flow in a deblocking filtering operation that copes with influence of a quantization matrix.

Referring now to the flowchart shown in FIG. 18, this deblocking filtering operation is described. First, an operation on the encoding side in an example using the above described functional blocks shown in FIG. 10 is described. In the example described above, α and β are used as the parameters for deblocking filtering in the case with the AVC method. In the examples shown in FIG. 18 and the later drawings, on the other hand, beta and tc are used as the parameters for deblocking filtering in the case with the HEVC method.

In step S301, the Bs determination unit 162 receives (acquires) mode information, motion vectors, and reference frame information as syntax elements from the lossless encoding unit 106. At this point, the difference generation unit 153 also receives a quantization matrix (a scaling list) as a syntax element from the lossless encoding unit 106.

In step S302, the Bs determination unit 162 detects a TU and a PU boundary. In step S303, the Bs determination unit 162 determines a Bs value based on the information acquired in step S301 and the TU and the PU boundary detected in step S302. The determined Bs value is supplied as a filter parameter to the filter determination unit 163.

In step S304, the difference generation unit 153 extracts a quantization matrix DC component (a DC component) related to a boundary block (or a region that is adjacent to the current region, with a boundary being interposed in between) from the quantization matrix acquired in step S301.

In step S305, the difference generation unit 153 calculates the boundary QP by using the extracted DC component.

Specifically, the difference generation unit 153 calculates the boundary QP by using the above described expression (34) after correcting the quantization parameter QPc of the current region C and the quantization parameter QPN of the neighboring region N adjacent to the current region C via a boundary according to the following expression (35).

[Mathematical Formula 1]

$$\frac{QS_{real}}{QS_{trans}} = \frac{DC}{16} = 2^{\frac{QP_{real}-QP_{trans}}{6}} \quad (35)$$

$$QP_{real} = QP_{trans} + 6 * \log_2 \frac{DC}{16}$$

Here, QPtrans and QStrans represent the QP in the bit stream and the QS (Quantization Scale) corresponding to the QP. QPreal and QSreal represent the QP corrected with a DC component of the scaling list and the QS corresponding to the QP. DC represents a DC component (1 through 255) of the scaling list, and has 16 as the default value.

The second term (the log term) in the right-hand side of the second equation of the above expression (35) does not need to be calculated in practice. Instead, the log term can be calculated for each of the DC components (1 through 255) beforehand, and be stored in a table for later reference.

The calculated boundary QP is supplied to the α/β determination unit 161.

In step S306, the α/β determination unit 161 determines beta and tc, which are the offset values (threshold values) for determining filtering strength, and supplies the determined beta and tc as filter parameters to the filter determination unit 163.

Pixel values yet to be subjected to deblocking filtering are input from the arithmetic operation unit 110 to the filter determination unit 163. In step S307, the filter determination unit 163 determines a filter, using the filter parameters from the α/β determination unit 161 and the Bs determination unit 162, and the pixel values yet to be subjected to deblocking filtering. That is, the filter determination unit 163 determines whether strong filtering is to be performed (strong), whether weak filtering is to be performed (weak), or whether no filtering is to be performed (off) on the boundary between the current region and the neighboring region, and determines the filter that is to be used in the filtering.

The filter determination unit 163 supplies control information about the determined filter and the pixel values yet to be subjected to deblocking filtering, to the filtering unit 164.

In step S308, based on the control information about the filter determined by the filter determination unit 163, the filtering unit 164 performs a deblocking filtering operation on the pixel values yet to be subjected to deblocking filtering. The filtering unit 164 outputs the pixel values subjected to the deblocking filtering to the frame memory 112.

Referring again to the flowchart shown in FIG. 18, the deblocking filtering operation on the decoding side is described. The decoding side is described with reference to the above described functional blocks shown in FIG. 14.

In step S301, the Bs determination unit 242 receives (acquires) mode information, motion vectors, and reference frame information as syntax elements from the lossless decoding unit 202. At this point, the difference generation unit 233 also receives a quantization matrix (a scaling list) as a syntax element from the lossless decoding unit 202.

In step S302, the Bs determination unit 242 detects a TU and a PU boundary. In step S303, the Bs determination unit 242 determines a Bs value based on the information acquired in step S301 and the TU and the PU boundary detected in step S302. The determined Bs value is supplied as a filter parameter to the filter determination unit 243.

In step S304, the difference generation unit 233 extracts a quantization matrix DC component (a DC component) related to a boundary block (or a region that is adjacent to the current region, with a boundary being interposed in between) from the quantization matrix acquired in step S301.

In step S305, the difference generation unit 233 calculates the boundary QP by using the extracted DC component.

Specifically, like the difference generation unit 153, the difference generation unit 233 calculates the boundary QP by using the above described expression (34) after correcting the quantization parameter QPc of the current region C and the quantization parameter QPN of the neighboring region N adjacent to the current region C via a boundary according to the above described expression (35). The calculated boundary QP is supplied to the α/β determination unit 241.

In step S306, the α/β determination unit 241 determines beta and tc, which are the offset values (threshold values) for determining filtering strength, and supplies the determined beta and tc as filter parameters to the filter determination unit 243.

Pixel values yet to be subjected to deblocking filtering are input from the arithmetic operation unit 205 to the filter determination unit 243. In step S307, the filter determination unit 243 determines a filter, using the filter parameters from the α/β determination unit 241 and the Bs determination unit 242, and the pixel values yet to be subjected to deblocking filtering. That is, the filter determination unit 243 determines whether strong filtering is to be performed (strong), whether weak filtering is to be performed (weak), or whether no filtering is to be performed (off) on the boundary between the current region and the neighboring region, and determines the filter that is to be used in the filtering.

The filter determination unit 243 supplies control information about the determined filter and the pixel values yet to be subjected to deblocking filtering, to the filtering unit 244.

In step S308, based on the control information about the filter determined by the filter determination unit 243, the filtering unit 244 performs a deblocking filtering operation on the pixel values yet to be subjected to deblocking filtering. The filtering unit 244 outputs the pixel values subjected to the deblocking filtering to the frame memory 209 and the screen rearrangement buffer 207.

As described above, the boundary QP is calculated after the quantization parameters are corrected by using DC components of a quantization matrix (a scaling list). Accordingly, block distortions can be more appropriately prevented.

<5. Fifth Embodiment>
[Example Operation Compatible with the Skip Mode]

As described above again with reference to FIG. 8, in a conventional case, the boundary QP for determining the parameters beta and tc is determined according to the above described expression (34) using the quantization parameter QPc of the current region C and the quantization parameter QPN of the neighboring region N adjacent to the current region C, with a boundary being interposed in between.

However, the value of QP is not reliable in a case where the neighboring region N does not have an orthogonal transform coefficient, as in a case where a unit for processing in the region is CU, or more particularly, a skip CU, or as in a case where a unit for processing in the region is a TU and a CBF (coded_block_flag) is 0, for example.

In view of this, the image encoding device 100 shown in FIG. 1 and the image decoding device 200 shown in FIG. 13 calculate the boundary QP to be used in determining the parameters beta and tc based on whether there is an orthogonal transform coefficient in a region adjacent to the current region, with a boundary being interposed in between.

Figure 19:
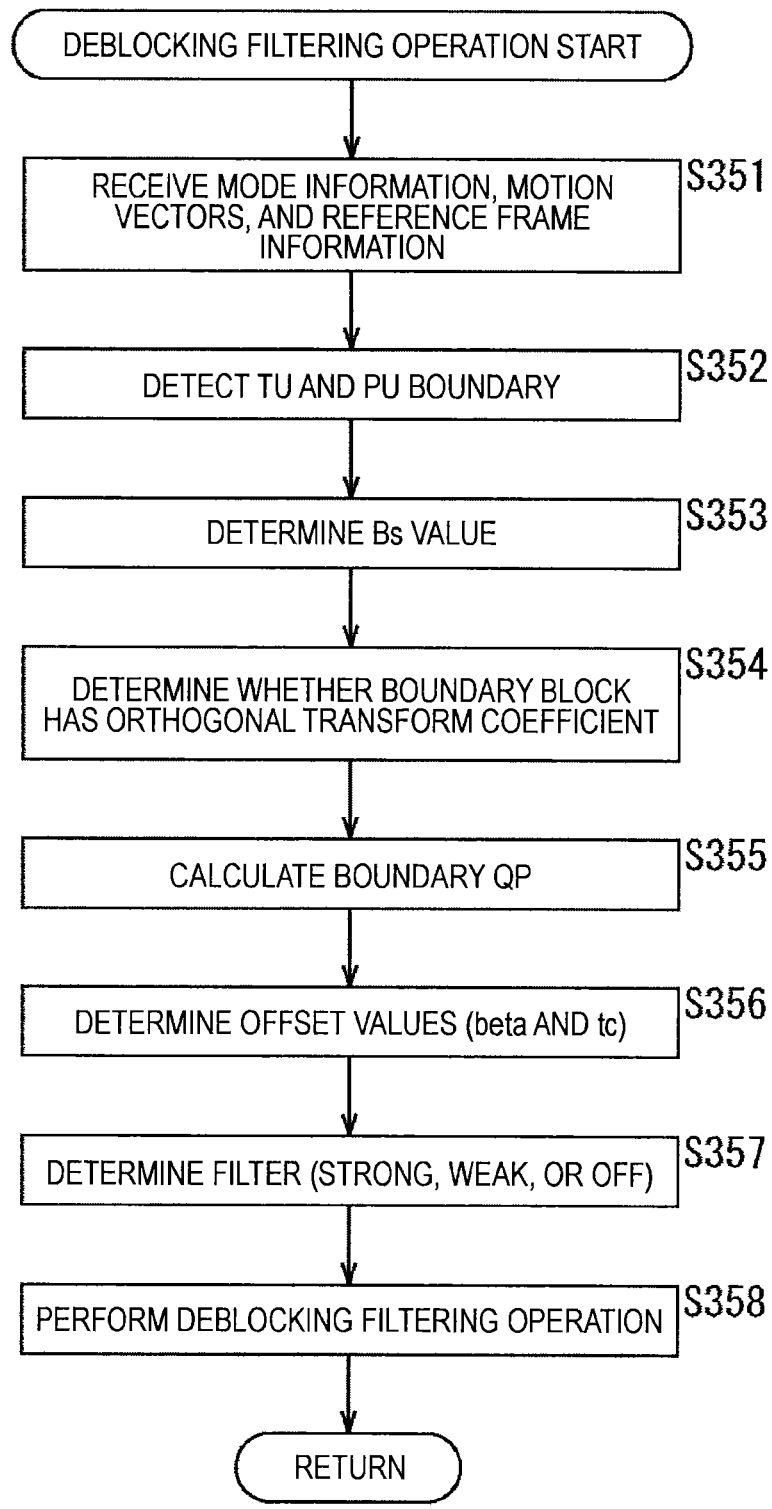
FIG. 19 is a flowchart for explaining an example flow in a deblocking filtering operation compatible with the skip mode.

Referring now to the flowchart shown in FIG. 19, this deblocking filtering operation is described. First, an operation on the encoding side in an example using the above described functional blocks shown in FIG. 10 is described.

In step S351, the Bs determination unit 162 receives (acquires) mode information, motion vectors, and reference frame information as syntax elements from the lossless encoding unit 106. At this point, the difference generation unit 153 also receives mode information, coded_block_flag, and the like as syntax elements from the lossless encoding unit 106.

In step S352, the Bs determination unit 162 detects a TU and a PU boundary. In step S353, the Bs determination unit 162 determines a Bs value based on the information acquired in step S351 and the TU and the PU boundary detected in step S352. The determined Bs value is supplied as a filter parameter to the filter determination unit 163.

In step S354, the difference generation unit 153 determines whether a boundary block (or a region adjacent to the current region, with a boundary being interposed in between) has an orthogonal transform coefficient. For example, in a case where the region is a CU, a check is made to determine whether there is an orthogonal transform coefficient based on the mode information acquired in step S351. In a case where the region is a TU, a check is made to determine whether there is an orthogonal transform coefficient based on the coded_block_flag acquired in step S351.

In step S305, the difference generation unit 153 calculates the boundary QP based on whether the boundary block has an orthogonal transform coefficient.

Referring now to FIG. 20, this aspect is specifically described. In the example shown in FIG. 20, circles and cross marks indicate existence and non-existence of an orthogonal transform coefficient in the region N and the region C shown in FIG. 8. Each circle indicates that there is an orthogonal transform coefficient, and each cross mark indicates that there is no orthogonal transform coefficient.

First, in a case where the region N and the region C each have an orthogonal transform coefficient, the boundary QP is calculated by using the above described expression (34) in a conventional manner.

In a case where one of the regions N and C has an orthogonal transform coefficient but the other one does not have an orthogonal transform coefficient, the boundary QP is calculated by using one of the following expressions (36) through (39) as proposed techniques 1 through 4.

$$\text{Proposed technique 1:boundary QP}=QPN \quad (36)$$

$$\text{Proposed technique 2:boundary QP}=(QPN+\text{prevQP}c+1)>>1 \quad (37)$$

$$\text{Proposed technique 3:boundary QP}=(QPN+\text{predQP}c+1)>>1 \quad (38)$$

$$\text{Proposed technique 4:boundary QP}=(QPN+\text{sliceQP}c+1)>>1 \quad (39)$$

In the expression (36), QPc=0. In the above expressions, prevQPx represents the QP used in the region immediately before a region x, predQPx represents the predicted QP (a predicted quantization parameter value) used in the region immediately before the region x, and slicePx represents the QP of the slice to which the region x belongs.

In a case where neither the region N nor the region C has an orthogonal transform coefficient, the boundary QP is calculated by using one of the following expressions (40) through (42) as proposed techniques A through C.

$$\text{Proposed technique }A\text{:boundary QP}=(\text{prevQP}N+\text{prevQP}c+1)>>1 \quad (40)$$

$$\text{Proposed technique }B\text{:boundary QP}=(\text{predQP}N+\text{predQP}c+1)>>1 \quad (41)$$

$$\text{Proposed technique }C\text{:boundary QP}=(\text{sliceQP}N+\text{sliceQP}c+1)>>1 \quad (42)$$

The calculated boundary QP is supplied to the α/β determination unit 161.

In step S356, the α/β determination unit 161 determines beta and tc, which are the offset values (threshold values) for determining filtering strength, and supplies the determined beta and tc as filter parameters to the filter determination unit 163.

Pixel values yet to be subjected to deblocking filtering are input from the arithmetic operation unit 110 to the filter determination unit 163. In step S357, the filter determination unit 163 determines a filter, using the filter parameters from the α/β determination unit 161 and the Bs determination unit 162, and the pixel values yet to be subjected to deblocking filtering. That is, the filter determination unit 163 determines whether strong filtering is to be performed (strong), whether weak filtering is to be performed (weak), or whether no filtering is to be performed (off) on the boundary between the current region and the neighboring region, and determines the filter that is to be used in the filtering.

The filter determination unit 163 supplies control information about the determined filter and the pixel values yet to be subjected to deblocking filtering, to the filtering unit 164.

In step S358, based on the control information about the filter determined by the filter determination unit 163, the filtering unit 164 performs a deblocking filtering operation on the pixel values yet to be subjected to deblocking filtering. The filtering unit 164 outputs the pixel values subjected to the deblocking filtering to the frame memory 112.

Referring again to the flowchart shown in FIG. 19, the deblocking filtering operation on the decoding side is described. The decoding side is described with reference to the above described functional blocks shown in FIG. 14.

In step S351, the Bs determination unit 242 receives (acquires) mode information, motion vectors, and reference frame information as syntax elements from the lossless decoding unit 202. At this point, the difference generation unit 233 also receives mode information, coded_block_flag, and the like as syntax elements from the lossless decoding unit 202.

In step S352, the Bs determination unit 242 detects a TU and a PU boundary. In step S353, the Bs determination unit 242 determines a Bs value based on the information acquired in step S351 and the TU and the PU boundary detected in step S352. The determined Bs value is supplied as a filter parameter to the filter determination unit 243.

In step S354, the difference generation unit 233 determines whether a boundary block (or a region adjacent to the current region, with a boundary being interposed in between) has an orthogonal transform coefficient. For example, in a case where the region is a CU, a check is made to determine whether there is an orthogonal transform coefficient based on the mode information acquired in step S351. In a case where the region is a TU, a check is made to determine whether there is an orthogonal transform coefficient based on the coded_block_flag acquired in step S351.

In step S305, the difference generation unit 233 calculates the boundary QP based on whether the boundary block has an orthogonal transform coefficient. Specifically, the same operation as that of the difference generation unit 153 described above with reference to FIG. 20 is performed. In a case where the region N and the region C each have an orthogonal transform coefficient, the boundary QP is calculated by using the above described expression (34) in a conventional manner.

In a case where one of the regions N and C has an orthogonal transform coefficient but the other one does not have an orthogonal transform coefficient, the boundary QP is calculated by using one of the above expressions (36) through (39) as proposed techniques 1 through 4.

In a case where neither the region N nor the region C has an orthogonal transform coefficient, the boundary QP is calculated by using one of the above expressions (40) through (42) as proposed techniques A through C. The calculated boundary QP is supplied to the α/β determination unit 241.

In step S356, the α/β determination unit 241 determines beta and tc, which are the offset values (threshold values) for determining filtering strength, and supplies the determined beta and tc as filter parameters to the filter determination unit 243.

Pixel values yet to be subjected to deblocking filtering are input from the arithmetic operation unit 205 to the filter determination unit 243. In step S357, the filter determination unit 243 determines a filter, using the filter parameters from the α/β determination unit 241 and the Bs determination unit 242, and the pixel values yet to be subjected to deblocking filtering. That is, the filter determination unit 243 determines whether strong filtering is to be performed (strong), whether weak filtering is to be performed (weak), or whether no filtering is to be performed (off) on the boundary between the current region and the neighboring region, and determines the filter that is to be used in the filtering.

The filter determination unit 243 supplies control information about the determined filter and the pixel values yet to be subjected to deblocking filtering, to the filtering unit 244.

In step S358, based on the control information about the filter determined by the filter determination unit 243, the filtering unit 244 performs a deblocking filtering operation on the pixel values yet to be subjected to deblocking filtering. The filtering unit 244 outputs the pixel values subjected to the deblocking filtering to the frame memory 209 and the screen rearrangement buffer 207.

As described above, as for a current region not having an orthogonal transform coefficient, the boundary QP is calculated by using the QP used in the region immediately before the current region, the QP used in the frame immediately after the current region, or the QP used in the slice to which the current region belongs, instead of the QP of the current region. In this manner, block distortions can be more appropriately prevented.

According to the HEVC method, max_cu_qp_delta_depth is set, and max_cu_qp_delta_depth specifies the granularity (depth) of a CU that is to transmit a quantization parameter. Further, according to the HEVC method, each CU having a size equal to or larger than the size designated in max_cu_qp_delta_depth transmits, as the quantization parameter of the CU, the quantization parameter of the first non_skip_CU having a lower granularity than the CU.

That is, in a case where the first (upper-left) CU forming a CU is a skip CU, and the next CU is a non_skip in raster scanning order, the quantization parameter of the next CU is transmitted.

In such a case, it is difficult to perform deblocking filtering on a CU-by-CU basis, because the quantization parameter of the first CU is not transmitted.

By the present technique, on the other hand, as for a skip CU, the boundary QP is calculated by using the QP used in the region immediately before the skip CU, the QP used in the frame immediately after the skip CU, or the QP for the slice to which the skip CU belongs, instead of the QP of the skip CU.

In this manner, deblocking filtering can be performed on a CU-by-CU basis even in the above described case.

In the above described example, the boundary between regions adjacent to each other in the horizontal direction in the drawing has been described with reference to FIG. 8 and others. However, the boundary between regions adjacent to each other in the vertical direction in the drawing is processed in the same manner as the boundary between regions adjacent to each other in the horizontal direction.

Although operations based on H.264/AVC as the encoding method have been described above, this disclosure is not limited to them, and can be applied to other encoding/decoding methods (such as the HEVC method) including deblocking filtering in the motion prediction/compensation loop.

This disclosure can be applied to image encoding devices and image decoding devices that are used when image information (bit streams) compressed through orthogonal transforms such as discrete cosine transforms and motion compensation is received via a network medium such as satellite broadcasting, cable television, the Internet, or a portable telephone device, as in MPEG or H.26x, for example. This disclosure can also be applied to image encoding devices and image decoding devices that are used when compressed image information is processed on a storage medium such as an optical or magnetic disk or a flash memory. Further, this disclosure can be applied to motion prediction/compensation devices included in such image encoding devices and image decoding devices.

<6. Sixth Embodiment>
[Personal Computer]

The above described series of operations can be performed by hardware, and can also be performed by software. When the series of operations are to be performed by software, the program forming the software is installed in a computer. Here, the computer may be a computer incorporated into special-purpose hardware, or may be a general-purpose personal computer that can execute various kinds of functions as various kinds of programs are installed thereinto.

Figure 21:
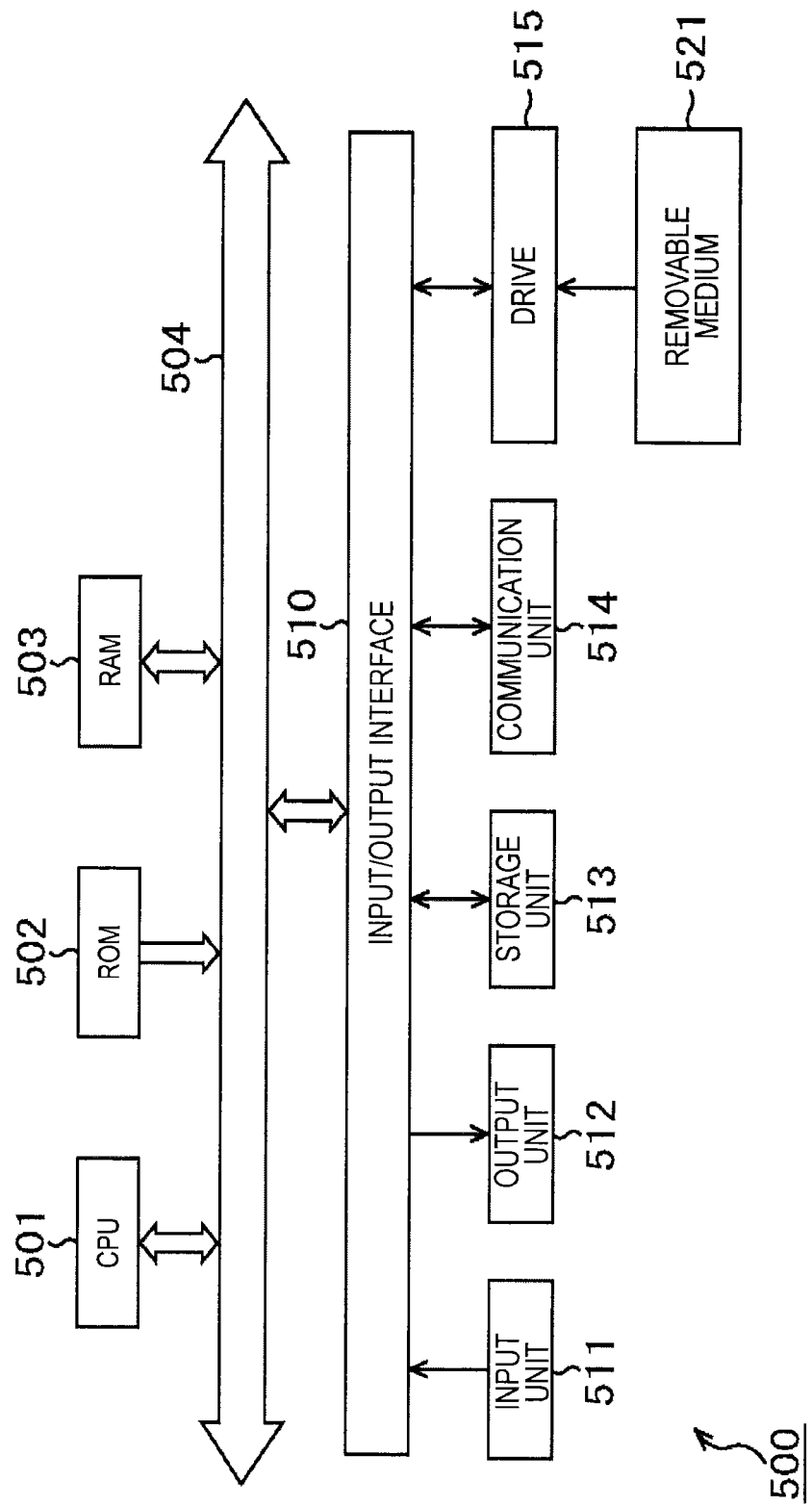
FIG. 21 is a block diagram showing a typical example structure of a computer.

In FIG. 21, the CPU (Central Processing Unit) 501 of the personal computer 500 performs various kinds of operations in accordance with a program stored in a ROM (Read Only Memory) 502 or a program loaded into a RAM (Random Access Memory) 503 from a storage unit 513. Necessary data for the CPU 501 to perform various kinds of operations and the like are also stored in the RAM 503, where necessary.

The CPU 501, the ROM 502, and the RAM 503 are connected to one another via a bus 504. An input/output interface 510 is also connected to the bus 504.

The input/output interface 510 has the following components connected thereto: an input unit 511 formed with a keyboard, a mouse, and the like; an output unit 512 formed with a display such as a CRT (Cathode Ray Tube) or a LCD (Liquid Crystal Display), a speaker, and the like; the storage unit 513 formed with a hard disk or the like; and a communication unit 514 formed with a modem or the like. The communication unit 514 performs communications via networks including the Internet.

A drive 515 is also connected to the input/output interface 510 where necessary, and a removable medium 521 such as a magnetic disk, an optical disk, a magnetooptical disk, or a semiconductor memory is mounted on the drive as appropriate. A computer program read from such a removable disk is installed into the storage unit 513 where necessary.

In a case where the above described series of operations are performed by software, the program forming the software is installed from a network or a recording medium.

As shown in FIG. 21, this recording medium is formed with the removable medium 521 that is distributed for delivering the program to users separately from the device, such as a magnetic disk (including a flexible disk), an optical disk (including a CD-ROM (Compact Disc-Read Only Memory) or a DVD (Digital Versatile Disc)), a magnetooptical disk (including an MD (Mini Disc)), or a semiconductor memory, which has the program recorded thereon. Alternatively, the recording medium may be formed with the ROM 502 having the program recorded therein or a hard disk included in the storage unit 513. Such a recording medium is incorporated beforehand into the device prior to the delivery to users.

The program to be executed by the computer may be a program for performing operations in chronological order in accordance with the sequence described in this specification, or may be programs for performing operations in parallel or performing an operation when necessary, such as when there is a call.

In this specification, the step of writing a program to be recorded on a recording medium includes not only operations to be performed in chronological order in accordance with the disclosed sequences, but also operations to be performed in parallel or independently of one another if not necessarily in chronological order.

In this specification, a "system" means an entire apparatus formed with two or more devices (apparatuses).

Also, in the above described examples, any structure described as one device (or one processing unit) may be divided into two or more devices (or processing units). Conversely, any structure described as two or more devices (or processing units) may be combined to form one device (or one processing unit). Also, it is of course possible to add a structure other than the above described ones to the structure of any of the devices (or any of the processing units). Further, as long as the structure and operations of the entire system will remain substantially the same, part of the structure of a device (or a processing unit) may be incorporated into the structure of another device (or another processing unit). That is, embodiments of the present technique are not limited to the above described embodiments, and various modifications may be made to them without departing from the scope of the technique.

The image encoding device and the image decoding device according to the above described embodiments can be applied to various electronic apparatuses including: transmitters and receivers for satellite broadcasting, cable broadcasting such as cable television, deliveries via the Internet, deliveries to terminals by cellular communications, and the like; recording apparatuses that record images on media such as optical disks, magnetic disks, or flash memories; or reproducing apparatuses that reproduce images from those storage media. In the following, four example applications are described.

<7. Seventh Embodiment>

[First Example Application: Television Receiver]

Figure 22:
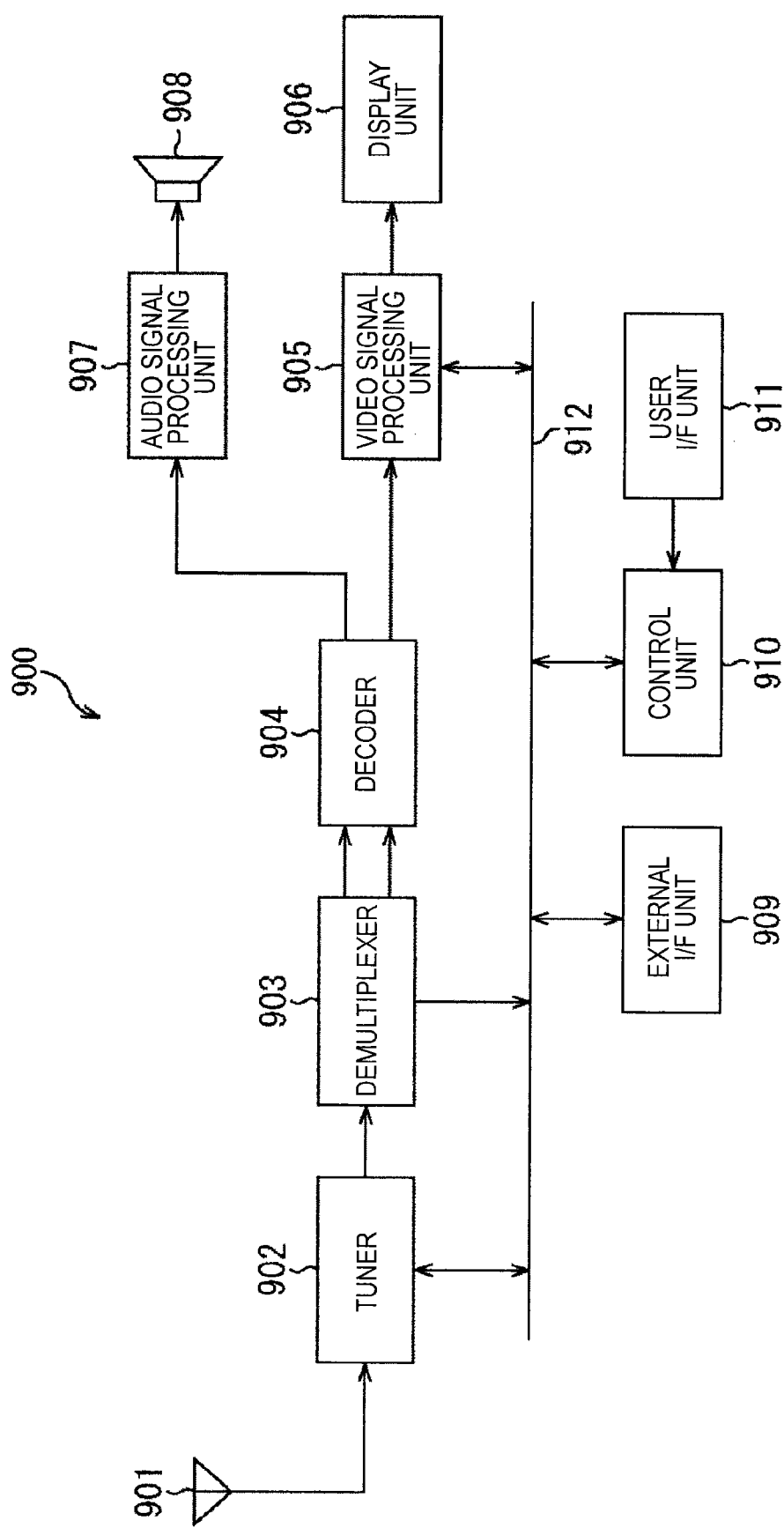
FIG. 22 is a block diagram schematically showing an example structure of a television apparatus.

FIG. 22 schematically shows an example structure of a television apparatus to which the above described embodiments are applied. The television apparatus 900 includes an antenna 901, a tuner 902, a demultiplexer 903, a decoder 904, a video signal processing unit 905, a display unit 906, an audio signal processing unit 907, a speaker 908, an external interface 909, a control unit 910, a user interface 911, and a bus 912.

The tuner 902 extracts a signal of a desired channel from broadcast signals received via the antenna 901, and demodulates the extracted signal. The tuner 902 outputs the encoded bit stream obtained by the demodulation to the demultiplexer 903. That is, the tuner 902 serves as a transmission means in the television apparatus 900 that receives encoded streams formed by encoding images.

The demultiplexer 903 separates the video stream and the audio stream of a show to be viewed from the encoded bit stream, and outputs the respective separated streams to the decoder 904. The demultiplexer 903 also extracts auxiliary data such as an EPG (Electronic Program Guide) from the encoded bit stream, and supplies the extracted data to the control unit 910. In a case where the encoded bit stream has been scrambled, the demultiplexer 903 may perform descrambling.

The decoder 904 decodes the video stream and the audio stream input from the demultiplexer 903. The decoder 904 then outputs the video data generated by the decoding operation to the video signal processing unit 905. The decoder 904 also outputs the audio data generated by the decoding operation to the audio signal processing unit 907.

The video signal processing unit 905 reproduces the video data input from the decoder 904, and causes the display unit 906 to display the video image. Also, the video signal processing unit 905 may cause the display unit 906 to display an application screen supplied via a network. Also, the video signal processing unit 905 may perform additional processing such as denoising on the video data in accordance with the settings. Further, the video signal processing unit 905 may generate an image of a GUI (Graphical User Interface) such as a menu and buttons or a cursor, and superimpose the generated image on an output image.

The display unit 906 is driven by a drive signal supplied from the video signal processing unit 905, and displays a video image or an image on the video screen of a display device (such as a liquid crystal display, a plasma display, or an OELD (Organic ElectroLuminescence Display)).

The audio signal processing unit 907 performs a reproducing operation such as a D/A conversion and amplification on the audio data input from the decoder 904, and outputs sound from the speaker 908. Also, the audio signal processing unit 907 may perform additional processing such as denoising on the audio data.

The external interface 909 is an interface for connecting the television apparatus 900 to an external device or a network. For example, a video stream or an audio stream received via the external interface 909 may be decoded by the decoder 904. That is, the external interface 909 also serves as a transmission means in the television apparatus 900 that receives encoded streams formed by encoding images.

The control unit 910 includes a processor such as a CPU, and a memory such as a RAM or a ROM. The memory stores the program to be executed by the CPU, program data, EPG data, data acquired via networks, and the like. The program stored in the memory is read by the CPU at the time of activation of the television apparatus 900, for example, and is then executed. By executing the program, the CPU controls operations of the television apparatus 900 in accordance with an operating signal input from the user interface 911, for example.

The user interface 911 is connected to the control unit 910. The user interface 911 includes buttons and switches for the user to operate the television apparatus 900, and a reception unit for remote control signals, for example. The user interface 911 generates an operating signal by detecting an operation by the user via those components, and outputs the generated operating signal to the control unit 910.

The bus 912 connects the tuner 902, the demultiplexer 903, the decoder 904, the video signal processing unit 905, the audio signal processing unit 907, the external interface 909, and the control unit 910 to one another.

In the television apparatus 900 having the above described structure, the decoder 904 has the functions of the image decoding device according to the above described embodiments. Accordingly, when images are decoded in the television apparatus 900, block distortions can be removed more appropriately, and higher subjective image quality can be achieved in decoded images.

[Second Example Application: Portable Telephone Device]

Figure 23:
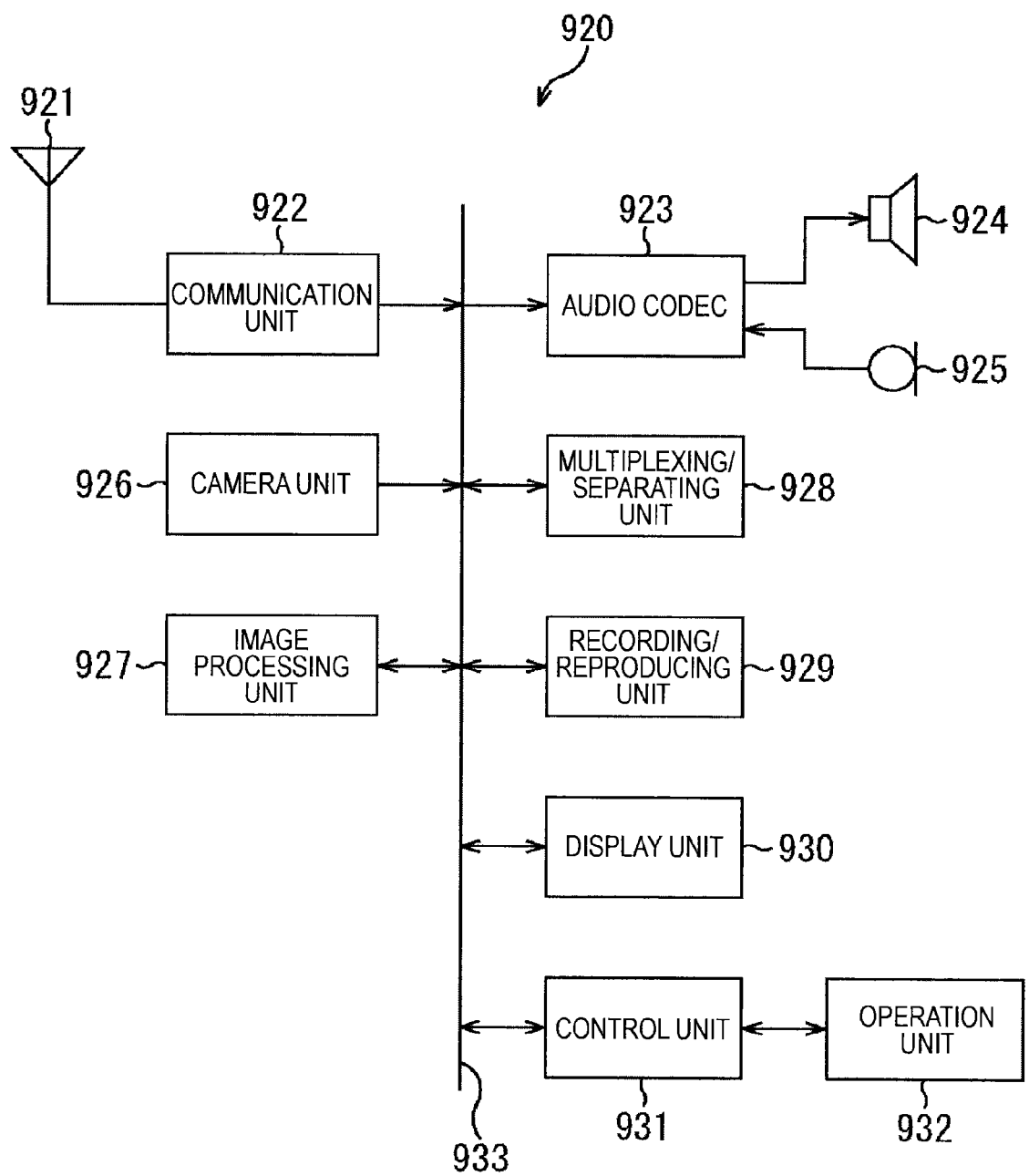
FIG. 23 is a block diagram schematically showing an example structure of a portable telephone device.

FIG. 23 schematically shows an example structure of a portable telephone device to which the above described embodiments are applied. The portable telephone device 920 includes an antenna 921, a communication unit 922, an audio codec 923, a speaker 924, a microphone 925, a camera unit 926, an image processing unit 927, a multiplexing/separating unit 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 connects the communication unit 922, the audio codec 923, the camera unit 926, the image processing unit 927, the multiplexing/separating unit 928, the recording/reproducing unit 929, the display unit 930, and the control unit 931 to one another.

The portable telephone device 920 performs operations such as transmission and reception of audio signals, transmission and reception of electronic mail or image data, imaging operations, and data recording in various operation modes including an audio communication mode, a data communication mode, an imaging mode, and a video phone mode.

In the audio communication mode, an analog audio signal generated by the microphone 925 is supplied to the audio codec 923. The audio codec 923 converts the analog audio signal to audio data, and performs compression and an A/D conversion on the converted audio data. The audio codec 923 outputs the compressed audio data to the communication unit 922. The communication unit 922 encodes and modulates the audio data, to generate a transmission signal. The communication unit 922 transmits the generated transmission signal to a base station (not shown) via the antenna 921. The communication unit 922 also performs amplification and a frequency conversion on a radio signal received via the antenna 921, and obtains a reception signal. The communication unit 922 generates audio data by demodulating and decoding the reception signal, and outputs the generated audio data to the audio codec 923. The audio codec 923 performs decompression and a D/A conversion on the audio data, to generate an analog audio signal. The audio codec 923 then outputs the generated audio signal to the speaker 924 to output sound.

In the data communication mode, the control unit 931 generates text data constituting an electronic mail in accordance with an operation by the user via the operation unit 932. The control unit 931 causes the display unit 930 to display the text. The control unit 931 also generates electronic mail data in accordance with a transmission instruction from the user via the operation unit 932, and outputs the generated electronic mail data to the communication unit 922. The communication unit 922 encodes and modulates the electronic mail data, to generate a transmission signal. The communication unit 922 transmits the generated transmission signal to a base station (not shown) via the antenna 921. The communication unit 922 also performs amplification and a frequency conversion on a radio signal received via the antenna 921, and obtains a reception signal. The communication unit 922 then restores the electronic mail data by demodulating and decoding the reception signal, and outputs the restored electronic mail data to the control unit 931. The control unit 931 causes the display unit 930 to display the contents of the electronic mail, and stores the electronic mail data into the storage medium in the recording/reproducing unit 929.

The recording/reproducing unit 929 includes a readable/rewritable storage medium. For example, the storage medium may be an internal storage medium such as a RAM or a flash memory, or may be a storage medium of an externally mounted type such as a hard disk, a magnetic disk, a magnetooptical disk, an optical disk, a USB (Unallocated Space Bitmap) memory, or a memory card.

In the imaging mode, the camera unit 926 generates image data by capturing an image of an object, and outputs the generated image data to the image processing unit 927. The image processing unit 927 encodes the image data input from the camera unit 926, and stores the encoded stream into the storage medium in the recording/reproducing unit 929.

In the video phone mode, the multiplexing/separating unit 928 multiplexes a video stream encoded by the image processing unit 927 and an audio stream input from the audio codec 923, and outputs the multiplexed stream to the communication unit 922. The communication unit 922 encodes and modulates the stream, to generate a transmission signal. The communication unit 922 transmits the generated transmission signal to a base station (not shown) via the antenna 921. The communication unit 922 also performs amplification and a frequency conversion on a radio signal received via the antenna 921, and obtains a reception signal. The transmission signal and the reception signal each include an encoded bit stream. The communication unit 922 restores a stream by demodulating and decoding the reception signal, and outputs the restored stream to the multiplexing/separating unit 928. The multiplexing/separating unit 928 separates the video stream and the audio stream from the input stream, and outputs the video stream to the image processing unit 927 and the audio stream to the audio codec 923. The image processing unit 927 decodes the video stream, to generate video data. The video data is supplied to the display unit 930, and a series of images are displayed by the display unit 930. The audio codec 923 performs decompression and a D/A conversion on the audio stream, to generate an analog audio signal. The audio codec 923 then outputs the generated audio signal to the speaker 924 to output sound.

In the portable telephone device 920 having the above described structure, the image processing unit 927 has the functions of the image encoding device and the image decoding device according to the above described embodiments. Accordingly, when images are encoded and decoded in the portable telephone device 920, block distortions can be removed more appropriately, and higher subjective image quality can be achieved in decoded images.

[Third Example Application: Recording/Reproducing Apparatus]

Figure 24:
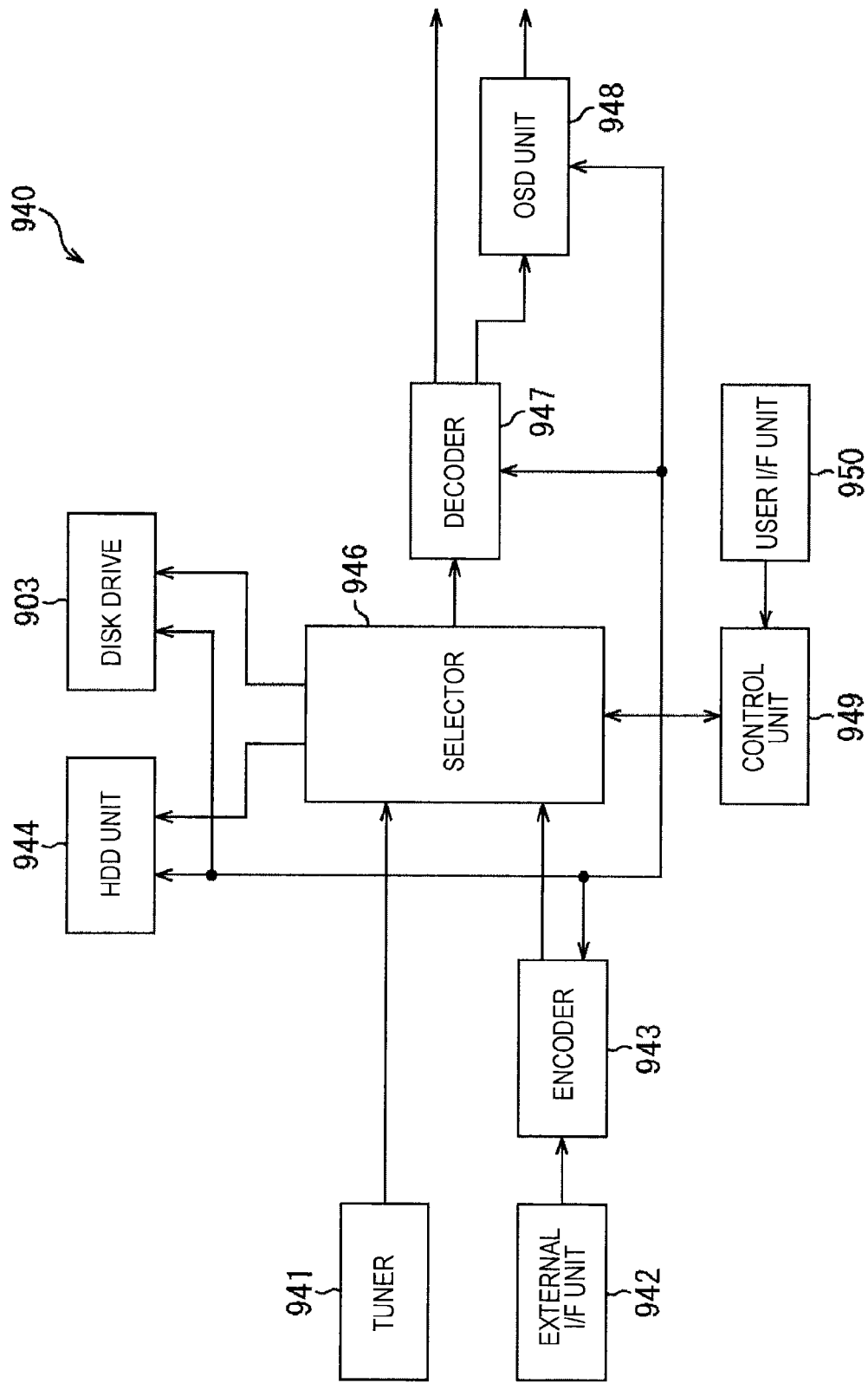
FIG. 24 is a block diagram schematically showing an example structure of a recording/reproducing apparatus.

FIG. 24 schematically shows an example structure of a recording/reproducing apparatus to which the above described embodiments are applied. A recording/reproducing apparatus 940 encodes audio data and video data of a received broadcast show, for example, and records the audio data and the video data on a recording medium. The recording/reproducing apparatus 940 may encode audio data and video data acquired from another apparatus, for example, and record the audio data and the video data on the recording medium. The recording/reproducing apparatus 940 also reproduces data recorded on the recording medium through a monitor and a speaker in accordance with an instruction from the user, for example. In doing so, the recording/reproducing apparatus 940 decodes audio data and video data.

The recording/reproducing apparatus 940 includes a tuner 941, an external interface 942, an encoder 943, an HDD (Hard Disk Drive) 944, a disk drive 945, a selector 946, a decoder 947, an OSD (On-Screen Display) 948, a control unit 949, and a user interface 950.

The tuner 941 extracts a signal of a desired channel from broadcast signals received via an antenna (not shown), and demodulates the extracted signal. The tuner 941 outputs the encoded bit stream obtained by the demodulation to the selector 946. That is, the tuner 941 serves as a transmission means in the recording/reproducing apparatus 940.

The external interface 942 is an interface for connecting the recording/reproducing apparatus 940 to an external device or a network. The external interface 942 may be an IEEE1394 interface, a network interface, a USB interface, or a flash memory interface, for example. Video data and audio data received via the external interface 942 are input to the encoder 943, for example. That is, the external interface 942 serves as a transmission means in the recording/reproducing apparatus 940.

In a case where video data and audio data input from the external interface 942 have not been encoded, the encoder 943 encodes the video data and the audio data. The encoder 943 then outputs an encoded bit stream to the selector 946.

The HDD 944 records an encoded bit stream formed by compressing content data such as video images and sound, various programs, and other data on an internal hard disk. At the time of reproduction of video images and sound, the HDD 944 reads those data from the hard disk.

The disk drive 945 records data on and reads data from a recording medium mounted thereon. The recording medium mounted on the disk drive 945 may be a DVD disk (such as a DVD-Video, a DVD-RAM, a DVD-R, a DVD-RW, a DVD+R, or a DVD+RW) or a Blu-ray (a registered trade name) disk, for example.

At the time of recording of video images and sound, the selector 946 selects an encoded bit stream input from the tuner 941 or the encoder 943, and outputs the selected encoded bit stream to the HDD 944 or the disk drive 945. At the time of reproduction of video images and sound, the selector 946 also outputs an encoded bit stream input from the HDD 944 or the disk drive 945, to the decoder 947.

The decoder 947 decodes the encoded bit stream, and generates video data and audio data. The decoder 947 outputs the generated video data to the OSD 948. The decoder 904 also outputs the generated audio data to an external speaker.

The OSD 948 reproduces the video data input from the decoder 947, and displays video images. The OSD 948 may superimpose an image of a GUI such as a menu and buttons or a cursor on the video images to be displayed.

The control unit 949 includes a processor such as a CPU, and a memory such as a RAM or a ROM. The memory stores the program to be executed by the CPU, program data, and the like. The program stored in the memory is read by the CPU at the time of activation of the recording/reproducing apparatus 940, for example, and is then executed. By executing the program, the CPU controls operations of the recording/reproducing apparatus 940 in accordance with an operating signal input from the user interface 950, for example.

The user interface 950 is connected to the control unit 949. The user interface 950 includes buttons and switches for the user to operate the recording/reproducing apparatus 940, and a reception unit for remote control signals, for example. The user interface 950 generates an operating signal by detecting an operation by the user via those components, and outputs the generated operating signal to the control unit 949.

In the recording/reproducing apparatus 940 having the above described structure, the encoder 943 has the functions of the image encoding device according to the above described embodiments. Also, the decoder 947 has the functions of the image decoding device according to the above described embodiments. Accordingly, when images are encoded and decoded in the recording/reproducing apparatus 940, block distortions can be removed more appropriately, and higher subjective image quality can be achieved in decoded images.

[Fourth Example Application: Imaging Apparatus]

Figure 25:
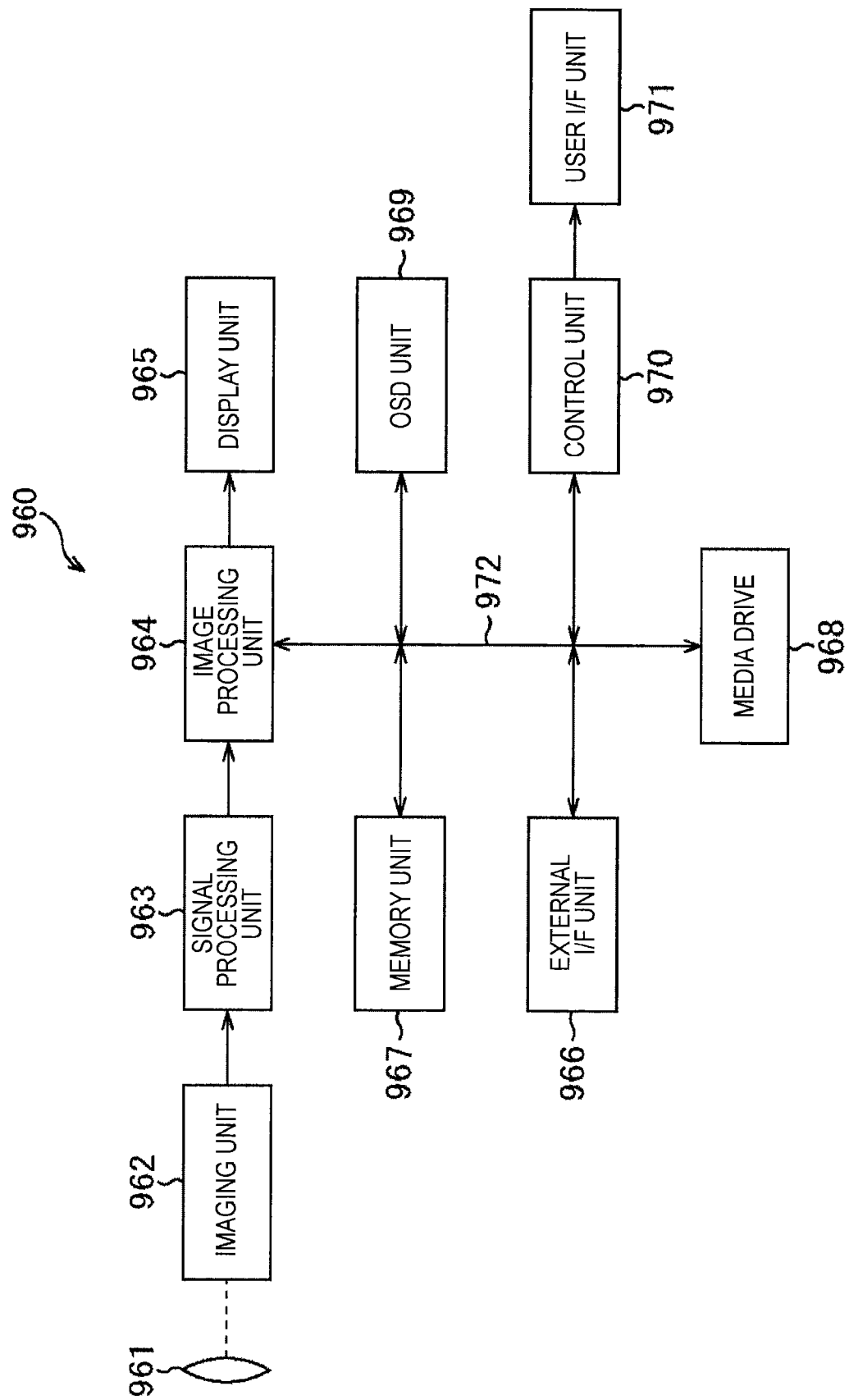
FIG. 25 is a block diagram schematically showing an example structure of an imaging apparatus.

FIG. 25 schematically shows an example structure of an imaging apparatus to which the above described embodiments are applied. An imaging apparatus 960 generates images by imaging an object, encodes the image data, and records the image data on a recording medium.

The imaging apparatus 960 includes an optical block 961, an imaging unit 962, a signal processing unit 963, an image processing unit 964, a display unit 965, an external interface 966, a memory 967, a media drive 968, an OSD 969, a control unit 970, a user interface 971, and a bus 972.

The optical block 961 is connected to the imaging unit 962. The imaging unit 962 is connected to the signal processing unit 963. The display unit 965 is connected to the image processing unit 964. The user interface 971 is connected to the control unit 970. The bus 972 connects the image processing unit 964, the external interface 966, the memory 967, the media drive 968, the OSD 969, and the control unit 970 to one another.

The optical block 961 includes a focus lens and a diaphragm. The optical block 961 forms an optical image of an object on the imaging surface of the imaging unit 962. The imaging unit 962 includes an image sensor such as a CCD (Charge Coupled Device) or a CMOS (Complementary Metal Oxide Semiconductor), and converts the optical image formed on the imaging surface into an image signal as an electrical signal by a photoelectric conversion. The imaging unit 962 outputs the image signal to the signal processing unit 963.

The signal processing unit 963 performs various kinds of camera signal processing such as a knee correction, a gamma correction, and a color correction on the image signal input from the imaging unit 962. The signal processing unit 963 outputs the image data subjected to the camera signal processing to the image processing unit 964.

The image processing unit 964 encodes the image data input from the signal processing unit 963, and generates encoded data. The image processing unit 964 outputs the generated encoded data to the external interface 966 or the media drive 968. The image processing unit 964 also decodes encoded data input from the external interface 966 or the media drive 968, and generates image data. The image processing unit 964 outputs the generated image data to the display unit 965. Alternatively, the image processing unit 964 may output the image data input from the signal processing unit 963 to the display unit 965 to display images. The image processing unit 964 may also superimpose display data acquired from the OSD 969 on the images to be output to the display unit 965.

The OSD 969 generates an image of a GUI such as a menu and buttons or a cursor, for example, and outputs the generated image to the image processing unit 964.

The external interface 966 is formed as a USB input/output terminal, for example. The external interface 966 connects the imaging apparatus 960 to a printer at the time of printing of an image, for example. A drive is also connected to the external interface 966, if necessary. A removable medium such as a magnetic disk or an optical disk is mounted on the drive so that a program read from the removable medium can be installed into the imaging apparatus 960. Further, the external interface 966 may be designed as a network interface to be connected to a network such as a LAN or the Internet. That is, the external interface 966 serves as a transmission means in the imaging apparatus 960.

A recording medium to be mounted on the media drive 968 may be a readable/rewritable removable medium such as a magnetic disk, a magnetooptical disk, an optical disk, or a semiconductor memory. Also, a recording medium may be fixed to the media drive 968, to form a non-portable storage unit such as an internal hard disk drive or an SSD (Solid State Drive).

The control unit 970 includes a processor such as a CPU, and a memory such as a RAM or a ROM. The memory stores the program to be executed by the CPU, program data, and the like. The program stored in the memory is read by the CPU at the time of activation of the imaging apparatus 960, for example, and is then executed. By executing the program, the CPU controls operations of the imaging apparatus 960 in accordance with an operating signal input from the user interface 971, for example.

The user interface 971 is connected to the control unit 970. The user interface 971 includes buttons and switches for the user to operate the imaging apparatus 960, for example. The user interface 971 generates an operating signal by detecting an operation by the user via those components, and outputs the generated operating signal to the control unit 970.

In the imaging apparatus 960 having the above described structure, the image processing unit 964 has the functions of the image encoding device and the image decoding device according to the above described embodiments. Accordingly, when images are encoded and decoded in the imaging apparatus 960, block distortions can be removed more appropriately, and higher subjective image quality can be achieved in decoded images.

In this specification, various kinds of information such as a difference quantization parameter are multiplexed with an encoded stream, and are transmitted from the encoding side to the decoding side, as described so far. However, the method of transmitting the information is not limited to the above example. The information may not be multiplexed with an encoded bit stream, but may be transmitted or recorded as independent data associated with an encoded bit stream. Here, the term "associate" means to link an image (or part of an image, such as a slice or a block) included in a bit stream to the information corresponding to the image at the time of decoding. In other words, the information may be transmitted through a different transmission path from images (or bit streams). Also, the information may be recorded on a different recording medium (or a different recording area in the same recording medium) from images (or bit streams). Further, each piece of the information may be associated with frames, one frame, or part of a frame of images (or bit streams).

Although preferred embodiments of this disclosure have been described above with reference to the accompanying drawings, this disclosure is not limited to those examples. It should be apparent to those who have ordinary skills in the art can make various changes or modifications within the scope of the technical spirit claimed herein, and it is naturally considered that those changes or modifications are within the technical scope of this disclosure.

The present technique can also be in the following forms.

(1) An image processing device including:

a decoding unit that decodes a bit stream encoded in a unit having a hierarchical structure, and generates an image;

a filtering unit that performs a filtering operation on the image generated by the decoding unit; and a filter adjustment unit that adjusts a parameter of the filtering unit so as to perform a strong filtering operation on a boundary between a current region to be processed in the image generated by the decoding unit and a neighboring region adjacent to the current region, when a difference value between a quantization parameter of the current region and a quantization parameter of the neighboring region is larger than a threshold value.

(2) The image processing device of (1), wherein the filter adjustment unit controls the filtering unit to select the stronger one of a predetermined strong filtering operation and a predetermined weak filtering operation.

(3) The image processing device of (1) or (2), wherein the filter adjustment unit adjusts the parameter of the filtering unit when the boundary is a boundary of a region in which a quantization parameter can be set.

(4) The image processing device of any of (1) through (3), wherein the parameter of the filtering unit is a boundary strength value, and the filter adjustment unit adds 1 to the boundary strength value, and sets the resultant value as the boundary strength value.

(5) The image processing device of any of (1) through (3), wherein the parameter of the filtering unit is a boundary strength value, and the filter adjustment unit sets 4 as the boundary strength value.

(6) The image processing device of any of (1) through (3), wherein the parameter of the filtering unit is a threshold value $\alpha$ and a threshold value $\beta$, and the filter adjustment unit associates the threshold value $\alpha$ and the threshold value $\beta$ with "QP+$\Delta$ ($\Delta$>0)", instead of the corresponding quantization parameter QP.

(7) The image processing device of any of (1) through (3), wherein the parameter of the filtering unit is a quantization parameter value, and the filter adjustment unit uses the larger one of the quantization parameter of the current region and the quantization parameter of the neighboring region as the parameter of the filtering unit.

(8) The image processing device of any of (1) through (3), wherein the parameter of the filtering unit is a quantization parameter value, and, when one of the current region and the neighboring region is in the IPCM mode, the filter adjustment unit uses the quantization parameter of the other region as the parameter of the filtering unit.

(9) The image processing device of any of (1) through (3), wherein the parameter of the filtering unit is a quantization parameter value, and the filter adjustment unit corrects the quantization parameters of the current region and the neighboring region by using a DC component of a quantization matrix, and determines the parameter of the filtering unit by using the corrected quantization parameters.

(10) The image processing device of any of (1) through (3), wherein the parameter of the filtering unit is a quantization parameter value, and, when at least one region of the current region and the neighboring region does not have an orthogonal transform coefficient, the filter adjustment unit determines the parameter of the filtering unit by using, as the quantization parameter of the at least one region, 0, a quantization parameter used in the region immediately before the at least one region, a predicted quantization parameter value for the region immediately before the at least one region, or a quantization parameter for the slice to which the at least one region belongs.

(11) The image processing device of any of (1) through (10), wherein the threshold value is set as a value that varies between a filtering operation in a horizontal direction and a filtering operation in a vertical direction.

(12) The image processing device of any of (1) through (11), wherein the threshold value is set as a value that varies with the size of the current region.

(13) The image processing device of any of (1) through (12), wherein the filter adjustment unit sets a value that becomes smaller as the size of the current region becomes larger.

(14) The image processing device of any of (1) through (13), wherein the filter adjustment unit controls the filtering unit to perform a filtering operation on a luminance component of the image generated by the decoding unit.

(15) The image processing device of any of (1) through (14), further including a difference value generation unit that generates the difference value between the quantization parameter of the current region and the quantization parameter of the neighboring region.

(16) An image processing method including:

decoding an image;

generating an image by decoding a bit stream encoded in a unit having a hierarchical structure;

when a difference value between a quantization parameter of a current region to be processed in the generated image and a quantization parameter of a neighboring region adjacent to the current region is larger than a threshold value, adjusting a filter parameter so as to perform a strong filtering operation on a boundary between the current region and the neighboring region; and performing the filtering operation on the generated image, the image decoding, the image generating, the parameter adjusting, and the filtering operation being performed by an image processing device.

(17) An image processing device including:

a filtering unit that performs a filtering operation on a locally decoded image when an image is encoded;

a filter adjustment unit that adjusts a parameter of the filtering unit so as to perform a strong filtering operation on a boundary between a current region to be processed in the image and a neighboring region adjacent to the current region, when a difference value between a quantization parameter of the current region and a quantization parameter of the neighboring region is larger than a threshold value; and an encoding unit that performs encoding in a unit having a hierarchical structure by using a predicted image that is the image subjected to the filtering operation.

(18) An image processing method including:

adjusting a filter parameter so as to perform a strong filtering operation on a boundary between a current region to be processed in an image and a neighboring region adjacent to the current region, when a difference value between a quantization parameter of the current region and a quantization parameter of the neighboring region is larger than a threshold value;

performing the filtering operation on a locally decoded image when the image is encoded; and performing encoding in a unit having a hierarchical structure by using a predicted image that is the image subjected to the filtering operation, the parameter adjusting, the filtering operation, and the encoding being performed by an image processing device.

REFERENCE SIGNS LIST

100 Image encoding device, 106 Lossless encoding unit, 108 Inverse quantization unit, 111 Deblocking filter, 121 Quantization parameter difference detection unit, 151 Neighboring quantization parameter buffer, 152 Current quantization parameter buffer, 153 Difference generation unit, 154 Threshold value determination unit, 161 α/β determination unit, 162 Bs determination unit, 163 Filter determination unit, 164 Filtering unit, 200 Image decoding device, 202 Lossless decoding unit, 203 Inverse quantization unit, 206 Deblocking filter, 221 Quantization parameter difference detection unit, 231 Neighboring quantization parameter buffer, 232 Current quantization parameter buffer, 233 Difference generation unit, 234 Threshold value determination unit, 241 α/β determination unit, 242 Bs determination unit, 243 Filter determination unit, 244 Filtering unit

The invention claimed is:

1. An image processing device comprising:
   a decoding unit configured to decode a bit stream encoded in a unit having a hierarchical structure, and generate an image;
   a filtering unit configured to perform a filtering operation on the image generated by the decoding unit; and
   a filter adjustment unit configured to adjust a parameter of the filtering unit so as to perform a first filtering operation, which is stronger in strength than a second filtering operation, on a boundary between a current region to be processed in the image generated by the decoding unit and a neighboring region adjacent to the current region, when a difference value between a quantization parameter of the current region and a quantization parameter of the neighboring region is larger than a threshold value.

2. The image processing device according to claim 1, wherein the filter adjustment unit controls the filtering unit to select the one of the first filtering operation and the second filtering operation.

3. The image processing device according to claim 1, wherein the filter adjustment unit adjusts the parameter of the filtering unit when the boundary is a boundary of a region in which a quantization parameter can be set.

4. The image processing device according to claim 1, wherein the parameter of the filtering unit is a boundary strength value, and the filter adjustment unit adds 1 to the boundary strength value, and sets the resultant value as the boundary strength value.

5. The image processing device according to claim 1, wherein the parameter of the filtering unit is a boundary strength value, and the filter adjustment unit sets 4 as the boundary strength value.

6. The image processing device according to claim 1, wherein the parameter of the filtering unit is a threshold value $\alpha$ and a threshold value $\beta$, and the filter adjustment unit associates the threshold value $\alpha$ and the threshold value $\beta$ with "QP+$\Delta(\Delta>0)$", instead of a corresponding quantization parameter QP.

7. The image processing device according to claim 1, wherein the parameter of the filtering unit is a quantization parameter value, and the filter adjustment unit uses the larger one of the quantization parameter of the current region and the quantization parameter of the neighboring region as the parameter of the filtering unit.

8. The image processing device according to claim 1, wherein the parameter of the filtering unit is a quantization parameter value, and, when one of the current region and the neighboring region is in an uncompressed mode, the filter adjustment unit uses the quantization parameter of the other one of the current region and the neighboring region as the parameter of the filtering unit.

9. The image processing device according to claim 1, wherein the parameter of the filtering unit is a quantization parameter value, and the filter adjustment unit corrects the quantization parameters of the current region and the neighboring region by using a DC component of a quantization matrix, and determines the parameter of the filtering unit by using the corrected quantization parameters.

10. The image processing device according to claim 1, wherein the parameter of the filtering unit is a quantization parameter value, and, when at least one region of the current region and the neighboring region does not have an orthogonal transform coefficient, the filter adjustment unit determines the parameter of the filtering unit by using, as the quantization parameter of the at least one region, 0, a quantization parameter used in a region immediately before the at least one region, a predicted quantization parameter value for a region immediately before the at least one region, or a quantization parameter for a slice to which the at least one region belongs.

11. The image processing device according to claim 1, wherein the threshold value is set as a value that varies between a filtering operation in a horizontal direction and a filtering operation in a vertical direction.

12. The image processing device according to claim 1, wherein the threshold value is set as a value that varies with the size of the current region.

13. The image processing device according to claim 12, wherein the threshold value is set as a value that becomes smaller as the size of the current region becomes larger.

14. The image processing device according to claim 1, wherein the filter adjustment unit controls the filtering unit to perform the first filtering operation on a luminance component of the image generated by the decoding unit.

15. The image processing device according to claim 1, further comprising a difference value calculation unit configured to calculate the difference value between the quantization parameter of the current region and the quantization parameter of the neighboring region.

16. An image processing method comprising:
generating an image by decoding a bit stream encoded in a unit having a hierarchical structure;
when a difference value between a quantization parameter of a current region to be processed in the generated image and a quantization parameter of a neighboring region adjacent to the current region is larger than a threshold value, adjusting a filter parameter so as to perform a first filtering operation, which is stronger in strength than a second filtering operation, on a boundary between the current region and the neighboring region; and
performing the first filtering operation on the generated image,
the image generating, the parameter adjusting, and the first filtering operation being performed by an image processing device.

17. An image processing device comprising:
a filtering unit configured to perform a filtering operation on a locally decoded image when an image is encoded;
a filter adjustment unit configured to adjust a parameter of the filtering unit so as to perform a first filtering operation, which is stronger in strength than a second filtering operation, on a boundary between a current region to be processed in the image and a neighboring region adjacent to the current region, when a difference value between a quantization parameter of the current region and a quantization parameter of the neighboring region is larger than a threshold value; and
an encoding unit configured to perform encoding in a unit having a hierarchical structure by using a predicted image that is the image subjected to the filtering operation.

18. An image processing method comprising:
adjusting a filter parameter so as to perform a first filtering operation, which is stronger in strength than a second filtering operation, on a boundary between a current region to be processed in an image and a neighboring region adjacent to the current region, when a difference value between a quantization parameter of the current region and a quantization parameter of the neighboring region is larger than a threshold value;
performing the first filtering operation on a locally decoded image when the image is encoded; and
performing encoding in a unit having a hierarchical structure by using a predicted image that is the image subjected to the first filtering operation,
the parameter adjusting, the first filtering operation, and the encoding being performed by an image processing device.

* * * * *